(12) United States Patent
Saban

(10) Patent No.: US 6,324,494 B1
(45) Date of Patent: Nov. 27, 2001

(54) METHOD AND SYSTEM FOR MODELING STATOR WINDING END-TURN LEAKAGE REACTANCE OF AN ELECTRIC MOTOR

(75) Inventor: Daniel M. Saban, Rockford, IL (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/596,094

(22) Filed: Jun. 16, 2000

(51) Int. Cl.$^7$ ................................. G06N 7/00; H02K 3/00
(52) U.S. Cl. ............................................. 703/13; 310/180
(58) Field of Search .............................. 703/1, 2, 4, 13; 310/179, 180, 254

(56) References Cited

U.S. PATENT DOCUMENTS

| | | | | |
|---|---|---|---|---|
| 4,442,393 | * | 4/1984 | Abbondanti | 318/802 |
| 5,619,435 | * | 4/1997 | Prakash et al. | 703/13 |

* cited by examiner

Primary Examiner—Burton S. Mullins
(74) Attorney, Agent, or Firm—Welsh & Katz, Ltd.; Damian G. Wasserbauer; Carl B. Horton

(57) ABSTRACT

An end-leakage flux approximation for turns of coils of a stator winding including at least two poles is developed for an electric motor having a stator with a predetermined number of stator slots within which the turns of the stator winding are distributed according to a predetermined distribution. The approximation is derived by developing a first indication representing a pole-to-pole permeance based on an approximated leakage flux path linking two poles and a second indication representing an individual pole permeance based on an approximated leakage flux path linking one pole and combining the first and second indications to produce an end-turn leakage flux approximation. At least one of the first and second indications is developed in accordance with a discrete representation of the predetermined distribution of the turns of the stator winding. The end-leakage flux approximation may advantageously be developed using a computer-based system.

30 Claims, 30 Drawing Sheets

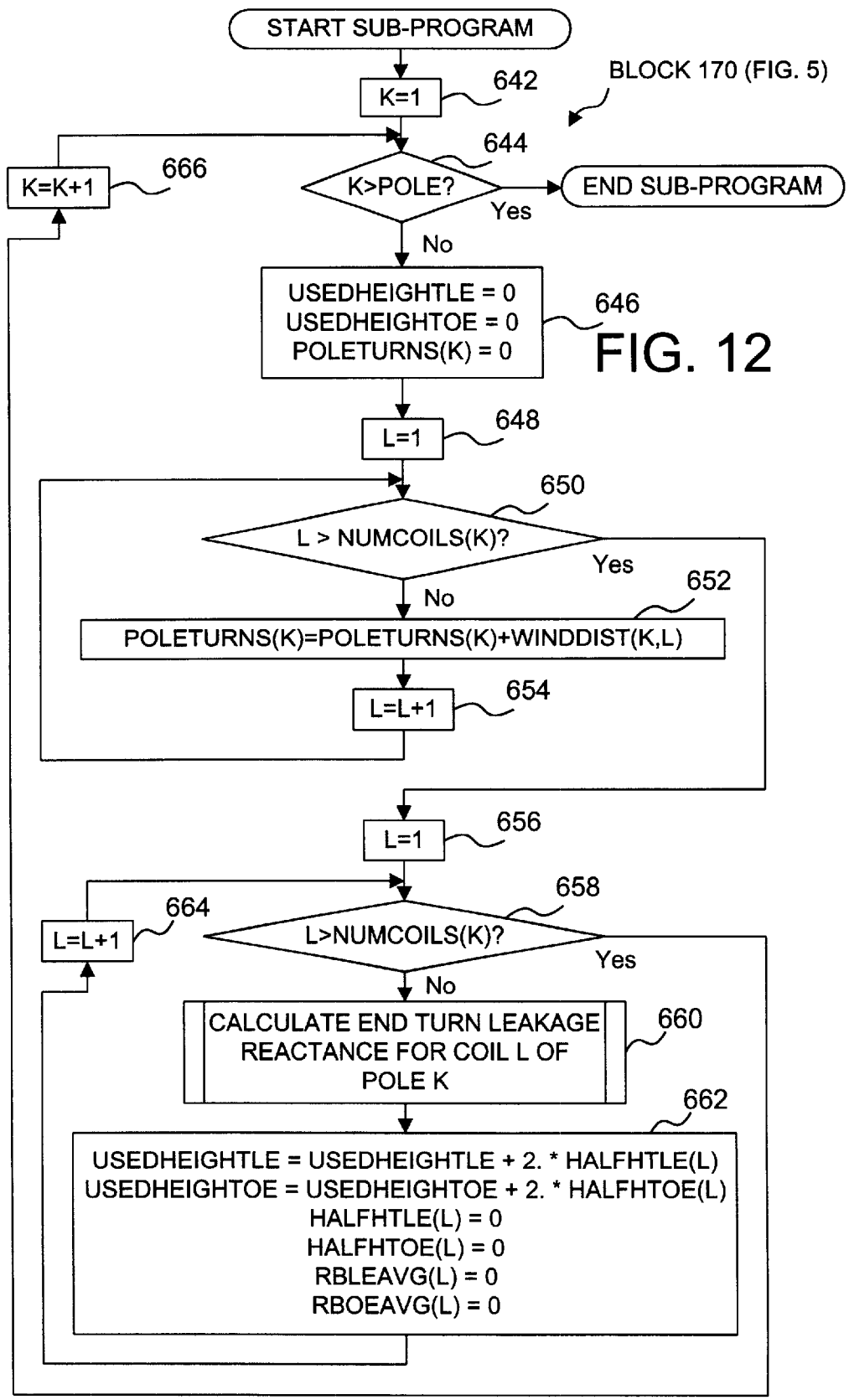

METHOD AND SYSTEM FOR MODELING STATOR WINDING END-TURN LEAKAGE REACTANCE OF AN ELECTRIC MOTOR

FIELD OF THE INVENTION

The present invention relates generally to electric motor modeling and, more particularly, to a method and system for approximating the end-turn leakage reactance associated with the stator windings of an electric motor for use in modeling the performance of the motor to facilitate testing of the motor design.

BACKGROUND OF THE INVENTION

Electric motors for use in particular applications typically must be designed to achieve particular performance characteristics, such as speed and torque output for a predetermined load and operating conditions, for example, and to satisfy particular physical constraints, such as motor size and weight, for example. Of course, in designing motors, efforts are also made to minimize the cost as much as possible. When a motor is designed for a given application, testing must be done to ensure that the designed motor meets whatever performance requirements and physical constraints may be specified for that application. However, it is costly to build an actual motor to test the underlying design for compliance with the specified performance requirements and physical constraints and then to refine the design, if necessary, and construct a new motor, sometimes repeatedly, until the final design meets the specified performance.requirements and physical constraints. To avoid some of the cost associated with such construction and testing, modeling techniques have been employed to simulate the performance of new motor designs, using digital computers, for example, to test whether such motor designs comply with specified performance requirements and physical constraints.

While the problem of modeling or simulating the performance of an electric motor is quite complex, prior modeling systems have simplified the problem by making assumptions about the structure and performance of the simulated motor to reduce the amount of computation required to model the motor. Those assumptions oversimplify the problem, however, and the prior modeling systems produce inaccurate simulation results in some cases and are less valuable because they do not accurately represent the performance of the actual motor.

SUMMARY OF THE INVENTION

The present invention generally relates to a method and apparatus for developing a more accurate approximation of the flux leakage reactance of the end-turn bundles of the stator windings of an electric motor, based on a discrete representation of the distribution of the turns of the coils of the stator winding for use in modeling the performance of the motor.

According to one aspect of the present invention, an end-turn leakage flux approximation is developed for turns of coils of a stator winding of an electric motor having a stator with a predetermined number of stator slots within which the turns of the stator winding are distributed according to a predetermined distribution. The stator winding includes at least two stator poles, and the end-turn leakage flux approximation is derived by developing a first indication representing a pole-to-pole permeance based on an approximated leakage flux path linking two poles, developing a second indication representing an individual pole permeance based on an approximated leakage flux path linking one pole, and combining the first and second indications to produce the end-turn leakage flux approximation, wherein at least one of the first and second indications is developed in accordance with a discrete representation of the predetermined distribution of the turns of the stator winding.

In some embodiments, one or both of the first and second indications may be based on: (1) the radial positions of the stator winding turns in respective stator winding slots; (2) the extent of distortion of the predetermined distribution of the stator winding turns from sinusoidal; (3) the order in which multiple stator windings are wound on the stator; and/or (4) the number of slots in the stator. Further, where the electric motor includes a plurality of stator windings, the first and second indications may represent respective permeance totals for all of the stator windings.

According to another aspect of the invention, at least one of the first and second indications may be developed by combining permeance contributions of a plurality of portions of the stator winding. In some embodiments, the plurality of portions of the stator winding may comprise circumferential segments of the stator winding, wherein at least one of the first and second indications may be developed by combining permeance contributions of each of the circumferential segments.

According to another aspect of the invention, the end-turn leakage flux approximation produced by the combining step comprises a parameter of a circuit model of the electric motor. Such a circuit model may be generated by computer to study the performance characteristics of new motor designs.

The method of the present invention may be embodied, for example, in a computer-based system for developing an end-turn leakage flux approximation for turns of coils of a stator winding of an electric motor having a stator with a predetermined number of stator slots within which the turns of the stator winding are distributed according to a predetermined distribution, said stator winding including at least two stator poles. One embodiment of such a system includes a processing unit coupled with a storage, a first set of instructions storable in the storage and executable by the processing unit for developing a first indication representing a pole-to-pole permeance based on an approximated leakage flux path linking two poles, a second set of instructions storable in the storage and executable by the processing unit for developing a second indication representing an individual pole permeance based on an approximated leakage flux path linking one pole, and a third set of instructions storable in the storage and executable by the processing unit for combining the first and second indications to produce an end-turn leakage flux approximation. In accordance with the method of the present invention, at least one of the first and second indications is developed in accordance with a discrete representation of the predetermined distribution of the turns of the stator winding.

The present invention alternatively may be embodied in a storage containing software for developing an end-turn leakage flux approximation for turns of coils of a stator winding of an electric motor having a stator with a predetermined number of stator slots within which the turns of the stator winding are distributed according to a predetermined distribution, said stator winding including at least two stator poles. Such a storage preferably includes means for developing a first indication representing a pole-to-pole permeance based on an approximated leakage flux path linking two poles, means for developing a second indication representing an individual pole permeance based on an approximated leakage flux path linking one pole, and means for combining the first and second indications to produce an end-turn leakage flux approximation, wherein at least one of the first and second indications is developed in accordance with a discrete representation of the predetermined distribution of the turns of the stator winding.

DESCRIPTION OF THE DRAWINGS

FIG. 12 is a flowchart of one implementation of the sub-program represented by block 170 of FIG. 5;

DETAILED DESCRIPTION OF THE INVENTION

A typical electric motor has a stator having one or more stator windings. As is well-known in the art, each stator winding may be wound such that, when the stator winding is energized, the stator winding forms two or more magnetic poles, each pole comprising one or more coils, wherein each coil comprises one or more turns. More particularly, turns of a stator winding may be distributed in a predetermined way among a plurality of slots of the stator.

In operation of the electric motor, useful (i.e., torque-producing) magnetic flux is produced by the axially extending portions of the turns of the stator windings disposed within the stator slots, and non-useful (i.e., non-torque-producing) magnetic flux is produced by the so-called end-turn bundles of the stator windings which extend generally circumferentially around the stator. Mathematically modeling the performance of the electric motor entails, among other things, approximating the end-turn leakage flux reactance of a stator winding of the electric motor.

In accordance with the present invention, the end-turn leakage flux reactance of a stator winding is approximated by developing a first indication representing a pole-to-pole permeance based on an approximated leakage flux path that links a pair of adjacent poles of the stator winding, developing a second indication representing an individual pole permeance based on a flux leakage path that links an individual pole of the stator winding, and combining the first and second indications to produce an end-turn leakage flux approximation, wherein at least one of the first and second indications is developed in accordance with a discrete representation of the predetermined distribution of the turns of the stator winding.

The stator winding may be modeled as a plurality of portions (e.g., angular segments), such that the pole-to-pole and individual-pole permeances may be derived by combining permeance contributions of the plurality of portions of the stator winding. For example, the plurality of portions of the stator winding can be circumferential segments of the stator winding, and either or both of the pole-to-pole and individual-pole permeances may be developed by combining permeance contributions of each of the circumferential segments.

Figure 1:
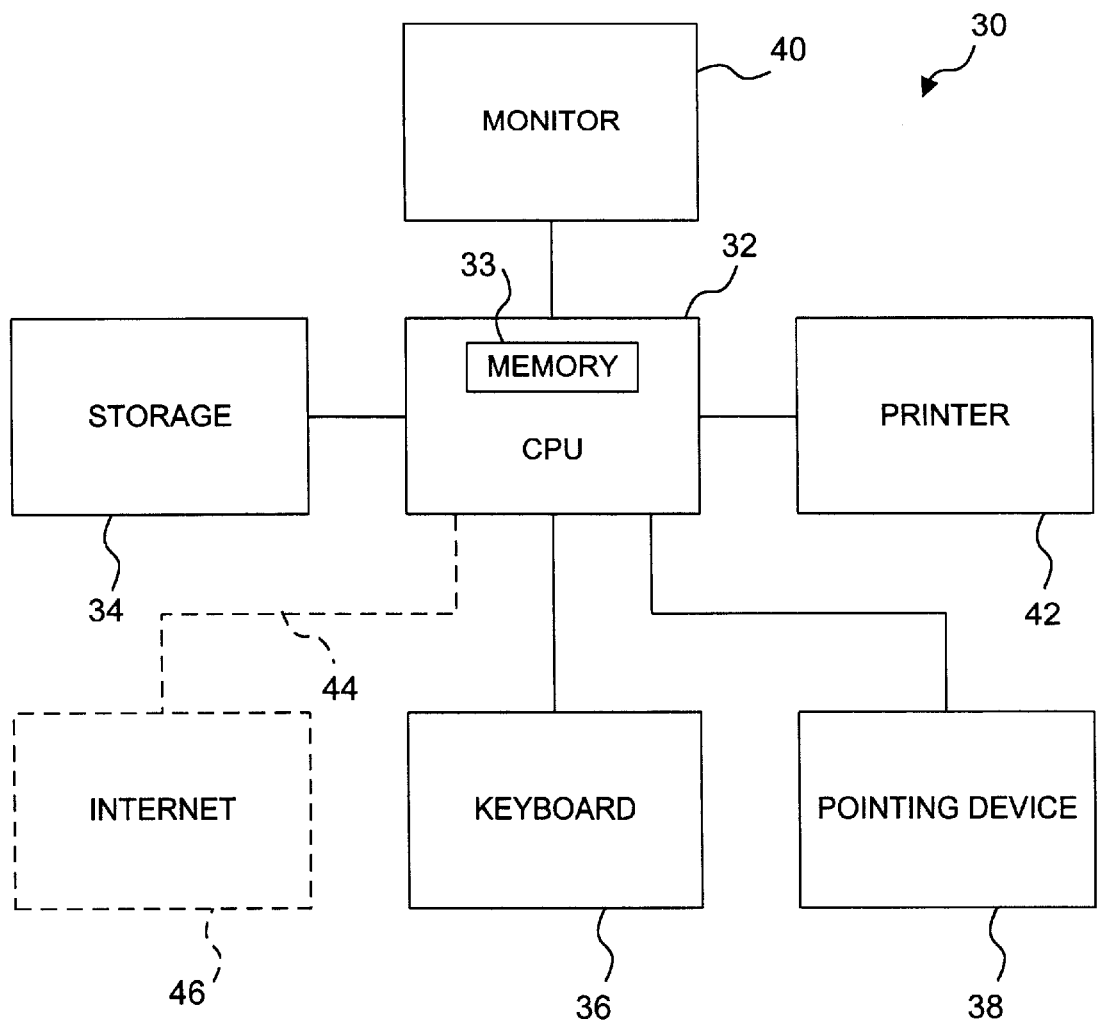
FIG. 1 is a block diagram of a computer-based system which may be used for implementation of the method of the present invention.

By way of example only, the method of the present invention may be embodied in a suitably programmed general-purpose computer, a dedicated computer, a microprocessor, or software stored in any desired storage medium. FIG. 1, for example, illustrates a computer-based system 30 including a central processing unit (CPU) 32 coupled with random-access and read-only memory 33, any other suitable memory or storage medium 34, a keyboard 36, a mouse or other suitable pointer control 38, a video monitor 40, an optional printer 42, an optional connection 44 to the Internet or other network (represented by a box 46 shown in dashed lines in FIG. 1), and any other desired peripheral devices (not shown). The storage 34 may comprise a fixed hard disk, a floppy disk, a compact disk (CD), or any other suitable memory or storage medium, including, for example, the read-only memory (ROM) or random-access memory (RAM) of the computer system 30.

In accordance with the present invention, the computer system 30 is programmed to develop an end-turn leakage flux approximation for turns of one or more stator windings of an electric motor. More particularly, the storage 34 or the memory 33 of the computer system 30 contains or may be loaded with software for carrying out the method of the present invention. Such software would include a first set of instructions storable in the storage 34 or the memory 33 and executable by the CPU 32 for developing a first indication representing a pole-to-pole permeance based on an approximated leakage flux path linking two poles, a second set of instructions similarly storable in the storage 34 or the memory 33 and executable by the CPU 32 for developing a second indication representing an individual pole permeance based on an approximated leakage flux path linking one pole, and a third set of instructions storable in the storage 34 or the memory 33 and executable by the CPU 32 for combining the first and second indications to produce an end-turn leakage flux approximation. In accordance with one aspect of the invention, at least one of the first and second indications is developed by the software in accordance with a discrete representation of the predetermined distribution of the turns of the stator winding.

Software for carrying out the present invention may be programmed in any suitable programming language and may comprise structured, sequential, or object-oriented code, as desired. A high-level flowchart illustrating one general approach to modeling an electric motor in accordance with the present invention is depicted in FIG. 2, and detailed flowcharts illustrating one embodiment of such software are depicted in FIGS. 3–10, collectively. These flowcharts are now described in detail.

Figure 2A:
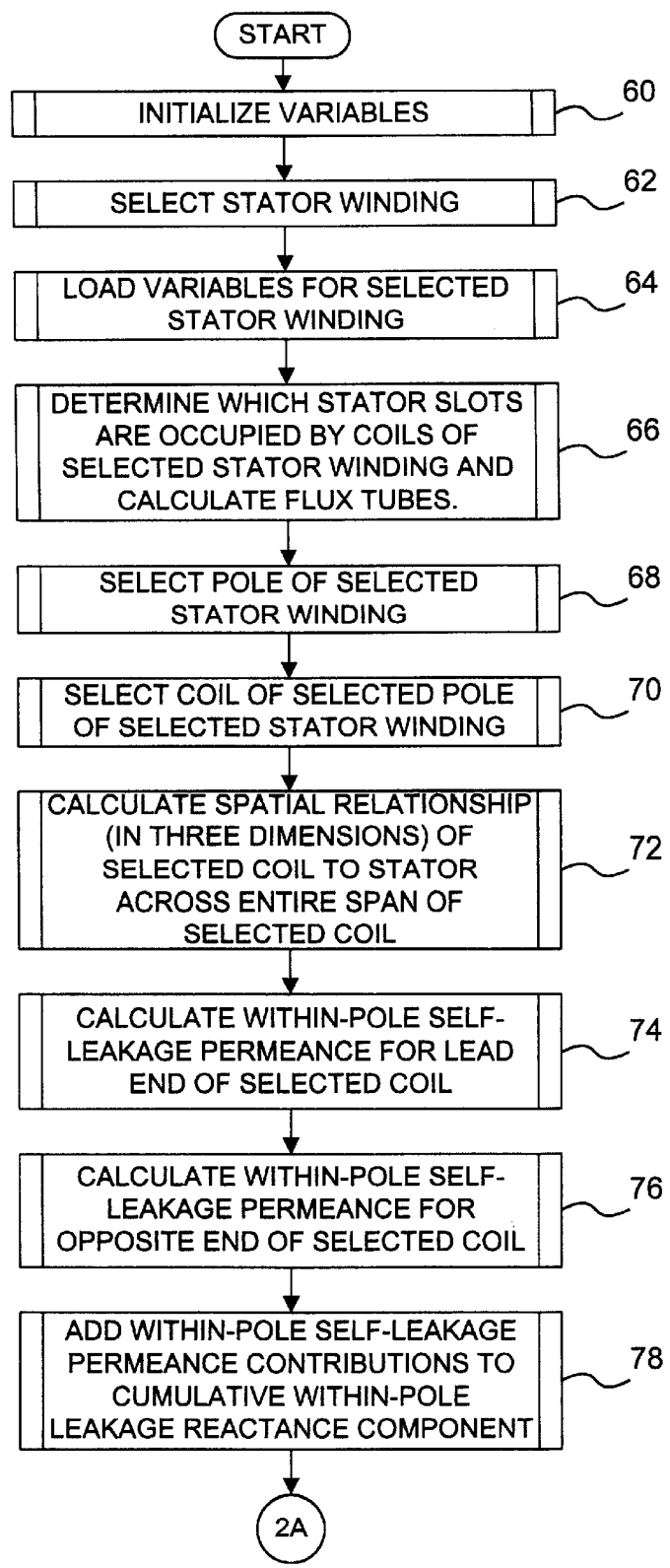
FIGS. 2A–2B, when joined along the similarly lettered lines appearing therein, are a functional flowchart of one embodiment of a method according to the present invention.
Figure 2B:
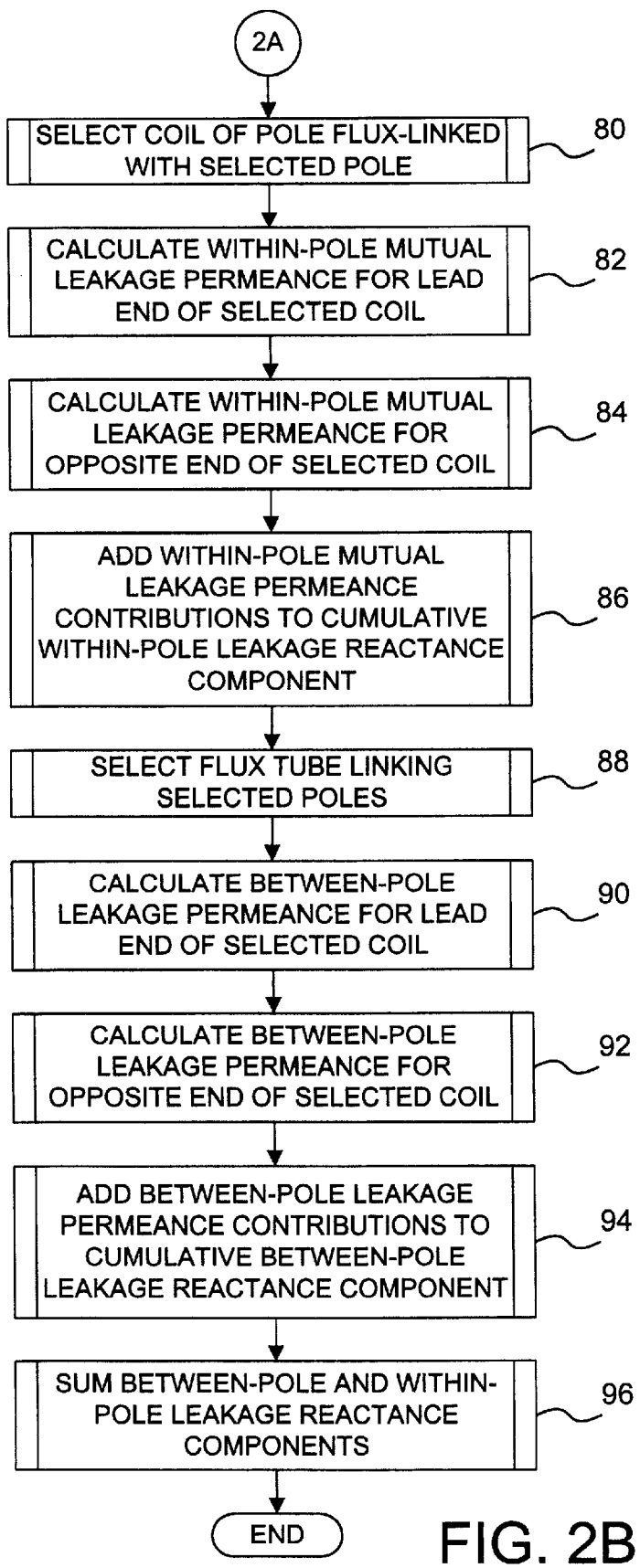

FIGS. 2A–2B depict a high-level flowchart representing in general detail one exemplary approach to modeling end-turn leakage flux permeance for an electric motor according to the present invention. As shown in FIG. 2A, programming executed by a block 60 initializes variables needed for program execution with values associated with a predetermined particular electric motor design. Programming executed by a block 62 then selects a winding of the stator of the particular motor design, and a block 64 loads variables associated with the selected stator winding into, for example, the memory 33 of the computer system 30 (FIG. 1). Programming executed by a block 66 then performs calculations to determine which slots of the stator in the particular motor design are occupied by the various coils making up the selected stator winding and calculates flux tubes associated with those coils during operation of the motor.

Thereafter, programming executed by a block 68 selects a pole of the selected stator winding, and programming executed by a block 70 selects a coil of the pole selected by the block 68. A block 72 then executes programming that calculates the three-dimensional spatial relationship of the coil selected by the programming executed by the block 70 to the stator across the entire span of the selected coil. A block 74 then executes programming that calculates the self-leakage permeance within the selected pole for the so-called "Lead-End" of the selected coil (i.e. the end of the selected coil located physically adjacent to the electrical leads or contacts of the selected stator winding). A block 76 then executes programming that calculates the self-leakage permeance within the selected pole for the "Opposite-End" of the selected coil (i.e., the end of the selected coil located physically opposite the electrical leads of the selected stator winding). A block 78 then executes programming that adds the within-pole self-leakage permeance contributions to a cumulative total of the within-pole leakage reactance components.

Subsequently, a block 80 (FIG. 2B) executes programming that selects a coil of a pole that is flux-linked with the selected pole, and blocks 82 and 84 executes programming that calculates the within-pole mutual leakage permeance for the lead-end and the opposite-end, respectively, of the selected coil. A block 86 then executes programming which adds the within-pole mutual leakage permeance contributions to a cumulative total of the within-pole leakage reactance components.

A block 88 then executes programming that selects a flux tube linking the two selected poles, and blocks 90 and 92 execute programming that calculates the between-pole leakage permeance for the lead-end and the opposite-end, respectively, of the selected coil. A block 94 executes programming that adds the between-pole leakage permeance contributions to a cumulative total of the between-pole leakage reactance components, and a block 96 then executes programming that sums the between-pole and within-pole leakage reactance components to thereby develop an end-turn leakage reactance approximation for the stator winding turns of the electric motor.

Figure 3:
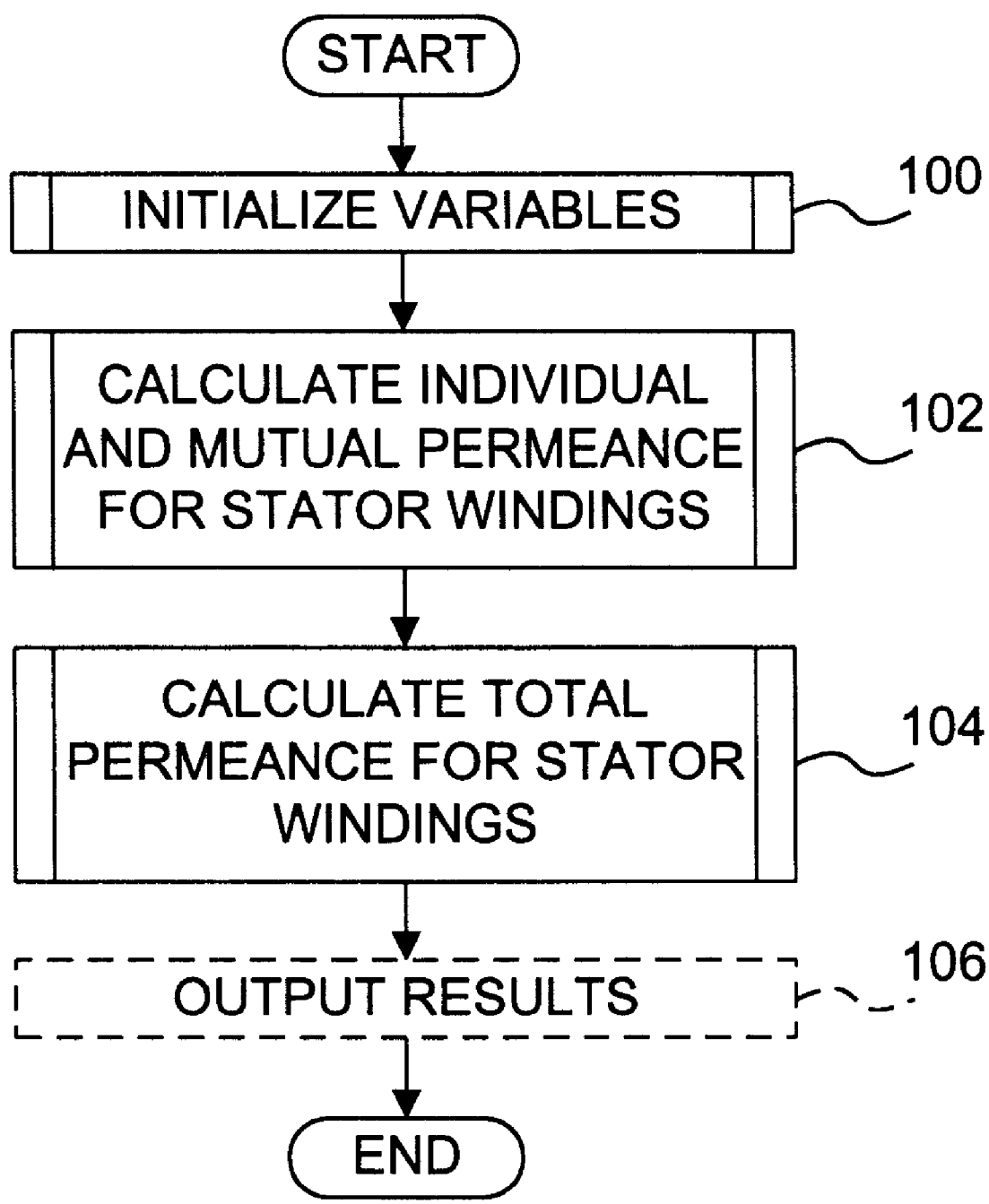
FIG. 3 is a high-level flowchart of an embodiment of software for carrying out the method of the present invention.

FIG. 3 depicts a flowchart of a main program for carrying out the method of the present invention. First, a sub-program represented by a block 100 in FIG. 3 initializes program variables. Throughout this description, where a block in a flowchart is described as performing an action, it should be understood that that action actually is to be performed by programming or program code corresponding to that block. Of course, the programming may be in the form of a single computer-executable instruction, or a subroutine or sub-program, or any other suitable form of sequential, modular, object-oriented, or other computer programming.

A second sub-program represented by a block 102 calculates pole-to-pole and individual-pole permeances for the various poles of the various stator winding of a given electric motor, and a third sub-program represented by a block 104 calculates total permeance for the stator windings of the motor. Each of these sub-programs is described below in detail. An optional fourth sub-program, illustrated by a block 106 in FIG. 3, may be provided to output the results of the foregoing calculations in any desired manner. Because the manner of outputting the results of the calculations forms no part of the present invention, and because such operations are readily performed by those of ordinary skill in the art, the details of this fourth sub-program are omitted herein.

Figure 4:
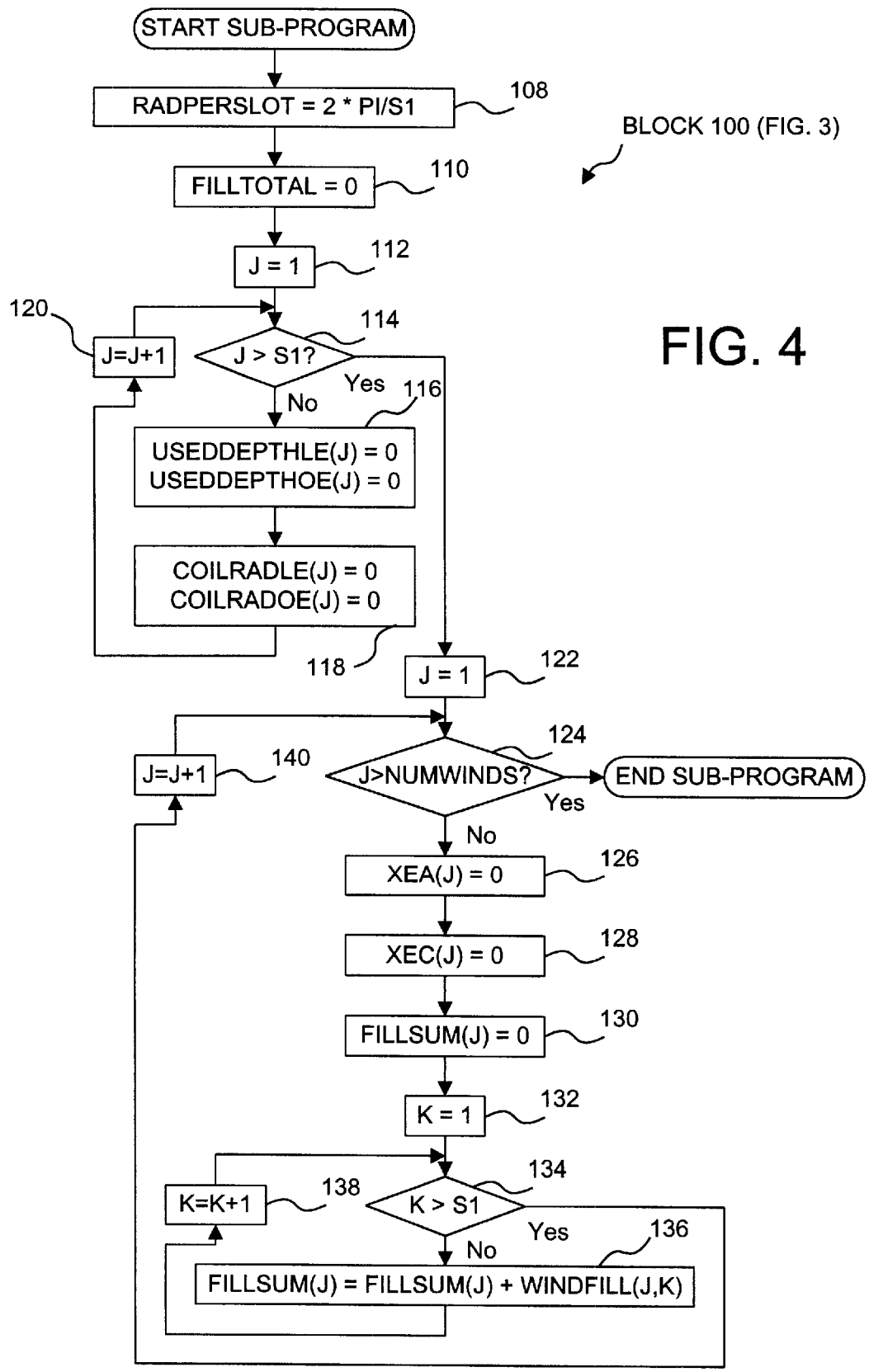
FIG. 4 is a flowchart of one implementation of the sub-program represented by block 100 of FIG. 3.

FIG. 4 depicts a flowchart illustrating one specific implementation of the sub-program represented by the block 100 of FIG. 1. This sub-program initializes some of the variables, arrays, and constants used by the remaining programming described herein. For convenience, as each subroutine or sub-program is described herein, the variables, arrays, and constants which are used in that subroutine or sub-program are described.

Because of the symmetry of motor designs, many of the variables, arrays, and constants appear in pairs, one designated "LE" and another designated "OE." The "LE" version refers to the value applicable to the "Lead End" of a winding, pole, coil, or turn (i.e., the end to which the physical "lead" or connector is coupled), and the "OE" counterpart refers to the value applicable to the "Opposite End" located 180 mechanical degrees apart from the Lead End with respect to the motor shaft. Also, any given implementation of the programming may be used for carrying out the method of the present invention with respect to a motor of a particular design having predetermined specifications and characteristics, and many of the variables, arrays, and constants are thus described with reference to specifications and characteristics of such a particular electric motor design.

The variables, arrays, and constants used by the sub-program of FIG. 4 are described in the following table.

| VARIABLE | DESCRIPTION |
|---|---|
| COILRADLE( ) | Array which stores for each stator slot in the particular motor design the distance from the axial center of the stator bore to the middle of the coil bundle occupying the stator slot - Lead End |
| COILRADOE( ) | Array which stores for each stator slot in the particular motor design the distance from the axial center of the stator bore to the middle of the coil bundle occupying the stator slot - Opposite End |
| FILLSUM( ) | Array which stores for each stator winding the sum of all of the stator slot area occupied by that stator winding in the particular motor design |
| FILLTOTAL | Variable which stores the total amount of stator slot area occupied by all of the windings in the particular motor design |
| J | Loop counter and/or array-index variable |
| K | Loop counter and/or array-index variable |
| NUMWINDS | Constant equal to the number of windings used for the stator in the particular motor design |
| RADSPERSLOT | Constant equal to the number of angular radians per stator slot in the particular motor design |
| S1 | Variable which stores the number of stator slots in the particular motor design |
| USEDDEPTHLE( ) | Array which stores for each stator slot in the particular motor design the depth of available coil bundle area in that slot occupied by windings inserted prior to the "active" winding (i.e., the winding being considered at any given point during execution of the program) - Lead End |
| USEDDEPTHOE( ) | Array which stores for each stator slot in the particular motor design the depth of available coil bundle area in that slot occupied by windings inserted prior to the "active" winding (i.e., the winding being considered at any given point during execution of the program) - Opposite End |
| WINDFILL(J,K) | Array which stores for each stator winding J and each stator slot K in the particular motor design the area of that stator slot occupied by that stator winding |
| XEA( ) | Array which stores for each stator winding in the particular motor design the net pole-to-pole leakage reactance for that stator winding |
| XEC( ) | Array which stores for each stator winding in the particular motor design the net reactance due to individual pole permeances of the poles of that stator winding |

As will be evident to those of ordinary skill in the art, the values of any variables specifying the geometric structure or other characteristics of the particular motor design may be supplied to the software as parameters or user input or incorporated directly into the program code, as desired.

As shown in the flowchart of FIG. 4, a block 108 sets the constant RADPERSLOT equal to 2*PI/S1, where PI is the well-known mathematical constant having a value of approximately 3.14159 and S1, as noted above, is the number of stator slots in the stator according to the particular motor design. A block 110 then sets FILLTOTAL equal to 0, and a block 112 initializes loop-counter variable J equal to 1.

A block 114 tests to determine whether J exceeds S1, the number of stator slots. If not, then a block 116 sets USEDDEPTHLE(J) and USEDDEPTHOE(J) equal to zero, a block 118 sets COILRADLE(J) and COILRADOE(J) equal to zero, and a block 120 increments loop-counter variable J by one, after which control returns to the block 114. When the block 114 determines that J exceeds S1, control passes to a block 122, which re-initializes the loop-counter variable J to one.

A block 124 then determines whether J exceeds NUMWINDS, the number of stator windings in the particular motor design. If not, a block 126 sets XEA(J) equal to zero, a block 128 sets XEC(J) equal to zero, a block 130 sets FILLSUM(J) equal to zero, and a block 132 initializes loop-counter variable K equal to one. A block 134 then determines whether K exceeds S1. If not, a block 136 sets FILLSUM(J) equal to the sum of FILLSUM(J) and WINDFILL(J,K), a block 138 increments the counter K by one, and control returns to the block 134. When the block 134 determines that K exceeds S1, control passes to a block 140, which increments the counter J by one, and then back to the block 124. When the block 124 determines that J exceeds NUMWINDS, execution of the sub-program of FIG. 4 ends, and control returns to the block 102 of FIG. 3.

Figure 5:
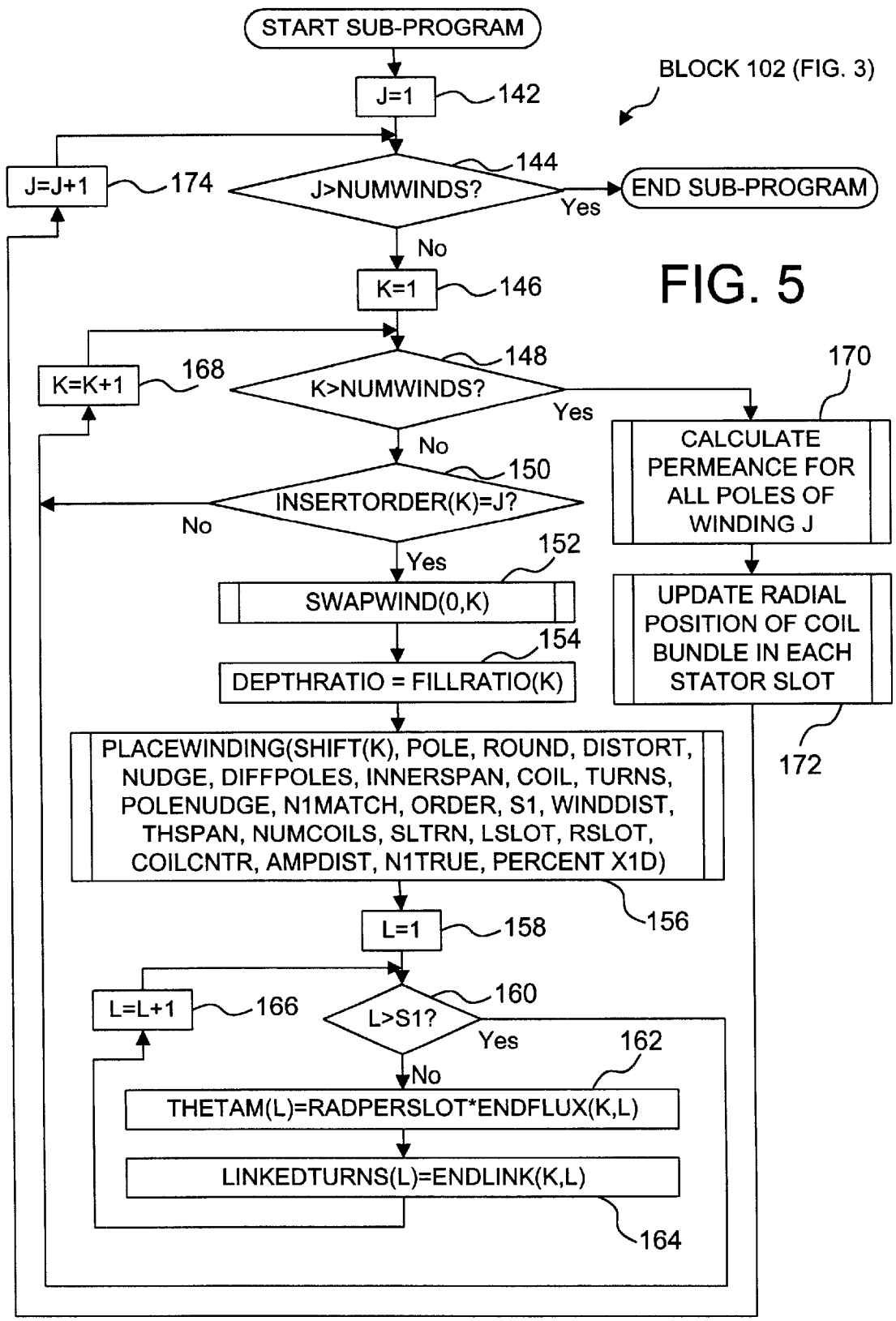
FIG. 5 is a flowchart of one implementation of the sub-program represented by block 102 of FIG. 3.

FIG. 5 depicts a flowchart illustrating one exemplary implementation of the sub-program represented by the block 102 of FIG. 3. This sub-program calculates individual-pole and pole-to-pole leakage reactance approximations for each of the stator windings of the particular motor design.

The variables, arrays, and constants used by the programming of FIG. 5 are described in the following table.

| VARIABLE | DESCRIPTION |
|---|---|
| DEPTHRATIO | Variable which stores the assumed depth of the end-turn bundle for the active winding in the particular motor design |
| ENDFLUX(K,L) | Array which stores for each stator winding K and each stator slot L the number of stator slots spanned by the flux tube associated with that stator winding and stator slot in the particular motor design (i.e., where the flux tube is) |
| ENDLINK(K,L) | Array which stores for each stator winding K and each stator slot L the number of linked turns for each flux tube associated with that stator winding and stator slot in the particular motor design (i.e., how many turns are encircled by the flux tube) |
| FILLRATIO( ) | Array which stores for each stator winding the ratio of the stator slot area occupied by that stator winding to the total stator slot area occupied by all stator windings in the particular motor design |
| INSERTORDER( ) | Array which stores for each stator winding the ordinal insertion order in which that stator winding is wound on the stator in the particular motor design |
| J | Loop counter and/or array-index variable |
| K | Loop counter and/or array-index variable |
| L | Loop counter and/or array-index variable |
| LINKEDTURNS( ) | Array which stores for each stator slot the number of linked turns associated with each flux tube in the particular motor design |
| NUMWINDS | Constant equal to the number of windings used for the stator in the particular motor design |
| RADPERSLOT | Constant equal to the number of radians per stator slot in the particular motor design |
| S1 | Variable which stores the number of stator slots in the particular motor design |
| THETAM( ) | Array which stores for each stator tooth the angle in mechanical radians spanned by the flux tube associated with that stator tooth |

As shown in FIG. 5, a block 142 initializes J to one, and a block 144 determines whether J exceeds NUMWINDS. If not, then a block 146 initializes K to one, and a block 148 determines whether K exceeds NUMWINDS. If not, then a block 150 determines whether INSERTORDER(K) is equal to J. If so, then a block 152 passes control to a subroutine referred to hereinafter as "SWAPWIND" with parameters 0 and K. This subroutine is described below in detail in connection with FIGS. 7A–7D.

When control returns from the SWAPWIND subroutine, a block 154 sets DEPTHRATIO equal to FILLRATIO(K), and a block 156 passes control to a subroutine referred to hereinafter as "PLACEWINDING" with parameters SHIFT (K), POLE, ROUND, DISTORT, NUDGE, DIFFPOLES, INNERSPAN, COIL, TURNS, POLENUDGE, N1MATCH, ORDER, S1, WINDDIST, THSPAN, NUMCOILS, SLTRN, LSLOT, RSLOT, COILCNTR, AMPDIST, N1TRUE, PERCENT, and X1D. The PLACEWINDING subroutine simply populates variables and/or arrays with values indicative of the physical placement of turns of stator windings in the various stator slots of the stator in the particular motor design. The implementation of such a subroutine is readily within the ability of those of ordinary skill in the art. However, the details of one exemplary implementation of the PLACEWINDING subroutine are described below in connection with FIGS. 8A–11C.

When control returns from the PLACEWINDING subroutine, a block 158 sets a loop-counter variable L equal to 1, and a block 160 determines whether L exceeds S1. If not, then a block 162 sets THETAM(L) equal to the product of RADPERSLOT and ENDFLUX(K,L), a block 164 sets LINKEDTURNS(L) equal to ENDLINK(K,L), a block 166 increments the loop-counter variable L by one, and control returns to the block 160 to re-test whether L exceeds S1. When the block 160 determines that L does exceed S1, a block 168 increments K by one, and control returns to the block 148. When the block 148 determines that K exceeds NUMWINDS, a block 170 passes control to a sub-program (described below in detail in connection with FIG. 12), which calculates the end-turn leakage reactance for all poles of stator winding J, and a block 172 thereafter passes control to a sub-program, which updates variables which store the current radial position of coil bundle in each stator slot. Because the implementation of such a sub-program is readily within the ability of those of ordinary skill in the art and forms no part of the present invention, the details of implementing this subprogram are omitted herein.

When control returns from the sub-program of the block 172, a block 174 increments the counter J by one, and control returns to the block 144 to test, once again, whether J exceeds NUMWINDS. When the block 144 determines that J exceeds NUMWINDS, execution of the sub-program of FIG. 5 ends, and control returns to the block 104 of FIG. 3.

Figure 6:
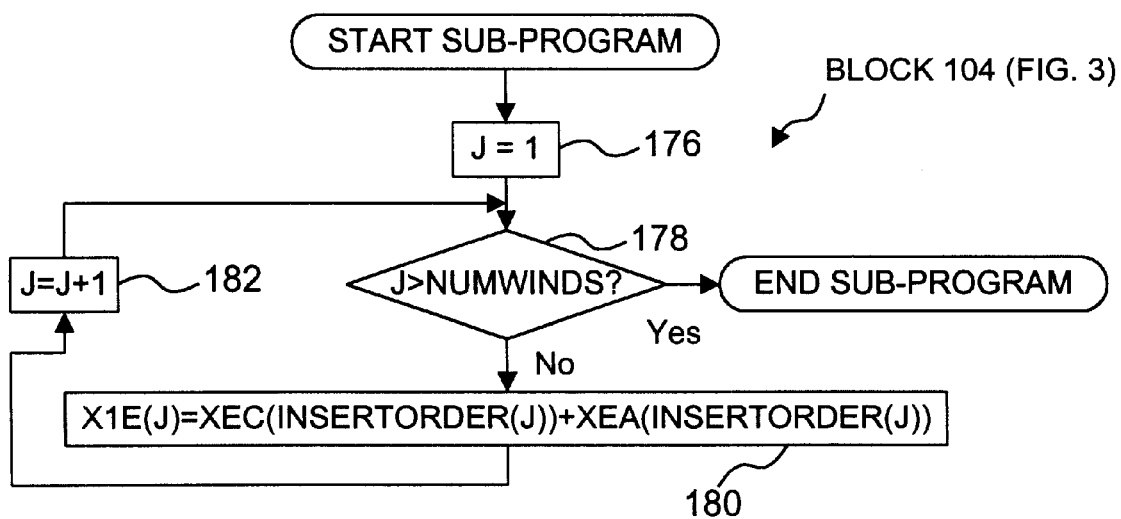
FIG. 6 is a flowchart of one implementation of the sub-program represented by block 104 of FIG. 3.

FIG. 6 depicts a flowchart illustrating one exemplary implementation of the sub-program represented by the block 104 of FIG. 1. This sub-program calculates total permeance for all of the stator windings of the particular motor design.

The variables, arrays, and constants used by the programming of FIG. 6 are described in the following table.

| VARIABLE | DESCRIPTION |
| --- | --- |
| INSERTORDER( ) | Array which stores for each stator winding the ordinal insertion order in which that stator winding is wound on the stator in the particular motor design |
| J | Loop counter and/or array-index variable |
| NUMWINDS | Constant equal to the number of windings used for the stator in the particular motor design |
| X1E( ) | Array which stores for each stator winding in the particular motor design the total end-turn leakage reactance of that stator winding |
| XEA( ) | Array which stores for each stator winding in the particular motor design the net pole-to-pole leakage reactance for that stator winding |
| XEC( ) | Array which stores for each stator winding in the particular motor design the net reactance due to individual pole permeances of the poles of that stator winding |

As shown in FIG. 6, a block 176 sets J equal to one, and a block 178 determines whether J exceeds NUMWINDS. If not, then a block 180 sets X1E(J) equal to the sum of XEC(INSERTORDER(J)) and (XEA(INSERTORDER(J)), a block 182 increments J by one, and control returns to the block 178. When the block 178 determines that J exceeds NUMWINDS, execution of the sub-program of FIG. 6 ends, and control returns to the block 106 of FIG. 3, which outputs the results of the calculations in any desired manner (e.g., graphically or in tabular form) to a printer or display screen or to a file for use in subsequent calculations, for example.

As noted above, FIGS. 7A–7D together depict a flowchart illustrating the "SWAPWIND" subroutine called by the block 152 of FIG. 5. This subroutine receives two parameters, WINDFROM and WINDTO, as input. WINDFROM and WINDTO are integers, each of which may have a value between zero and NUMWINDS, inclusive. In addition, the variables, arrays, and constants used by the SWAPWIND subroutine are described in the following table.

| VARIABLE | DESCRIPTION |
| --- | --- |
| COIL( ) | Array which stores for each distinct pole of the active winding the number of coils for that distinct pole in the particular motor design |
| COILCT | Constant which stores the maximum number of coils in the active stator winding in the particular motor design |
| DFPL | Constant which stores the maximum number of distinct poles in a stator winding in the particular motor design |
| DIFFPOLES | Variable which stores the number of distinct poles in the active stator winding |
| DISTORT | Boolean flag variable indicating whether the turn distribution of the active winding should be distorted from nearest sinusoid |
| INNERSPAN( ) | Array which stores for each distinct pole of the active winding the number of stator teeth spanned by the innermost coil of that distinct pole in the particular motor design |
| J | Loop counter and/or array-index variable |
| K | Loop counter and/or array-index variable |
| M | Loop counter and/or array-index variable |
| N | Loop counter and/or array-index variable |
| N1MATCH | Variable which stores the desired effective number of turns for the fundamental component of the winding distribution |
| NUDGE | Boolean flag variable indicating whether poles should be circumferentially offset from their typical centers (required for fractional slots-per-pole motor designs) |
| ORDER( ) | Array which stores for each pole of the active winding an identification of a distinct pole embodied by that pole |
| PL | Constant which stores the maximum number of poles in the active stator winding in the particular motor design |
| POLE | Variable which stores the number of poles in the active stator winding |
| POLENUDGE( ) | Array which stores for each pole of the active winding the number of slots that pole is |

-continued

| VARIABLE | DESCRIPTION |
|---|---|
| | nudged off center (to the right if positive and to the left if negative) |
| ROUND | Boolean flag variable indicating whether numbers of turns should be rounded off |
| SWAPCOIL(K,M) | Array which stores for each distinct pole M of each winding K in the particular motor design the value of COIL for that distinct pole of that winding |
| SWAPDFPOLES( ) | Array which stores for each winding in the particular motor design the value of DIFFPOLES for that winding |
| SWAPDISTORT( ) | Array which stores for each winding in the particular motor design the value of DISTORT for that winding |
| SWAPINSPAN(K,M) | Array which stores for each distinct pole M of each winding K in the particular motor design the value of INSPAN for that distinct pole of that winding |
| SWAPN1MATCH( ) | Array which stores for each winding in the particular motor design the value of N1MATCH for that winding |
| SWAPNUDGE( ) | Array which stores for each winding in the particular motor design the value of NUDGE for that winding |
| SWAPORDER( ) | Array which stores for each winding in the particular motor design the value of ORDER for that winding |
| SWAPPLNUDGE(K,M) | Array which stores for each distinct pole M of each winding K in the particular motor design the value of POLENUDGE for that distinct pole of that winding |
| SWAPPOLE( ) | Array which stores for each winding in the particular motor design the value of POLE for that winding |
| SWAPROUND( ) | Array which stores for each winding in the particular motor design the value of ROUND for that winding |
| SWAPTURNS(K,M,N) | Array which stores for each coil N of each distinct pole M of each winding K in the particular motor design the number of turns in that coil of that distinct pole of that winding |
| TURNS(M,N) | Array which stores for each coil N of each distinct pole M in the particular motor design the number of turns in that coil of that distinct pole |

Figure 7A:
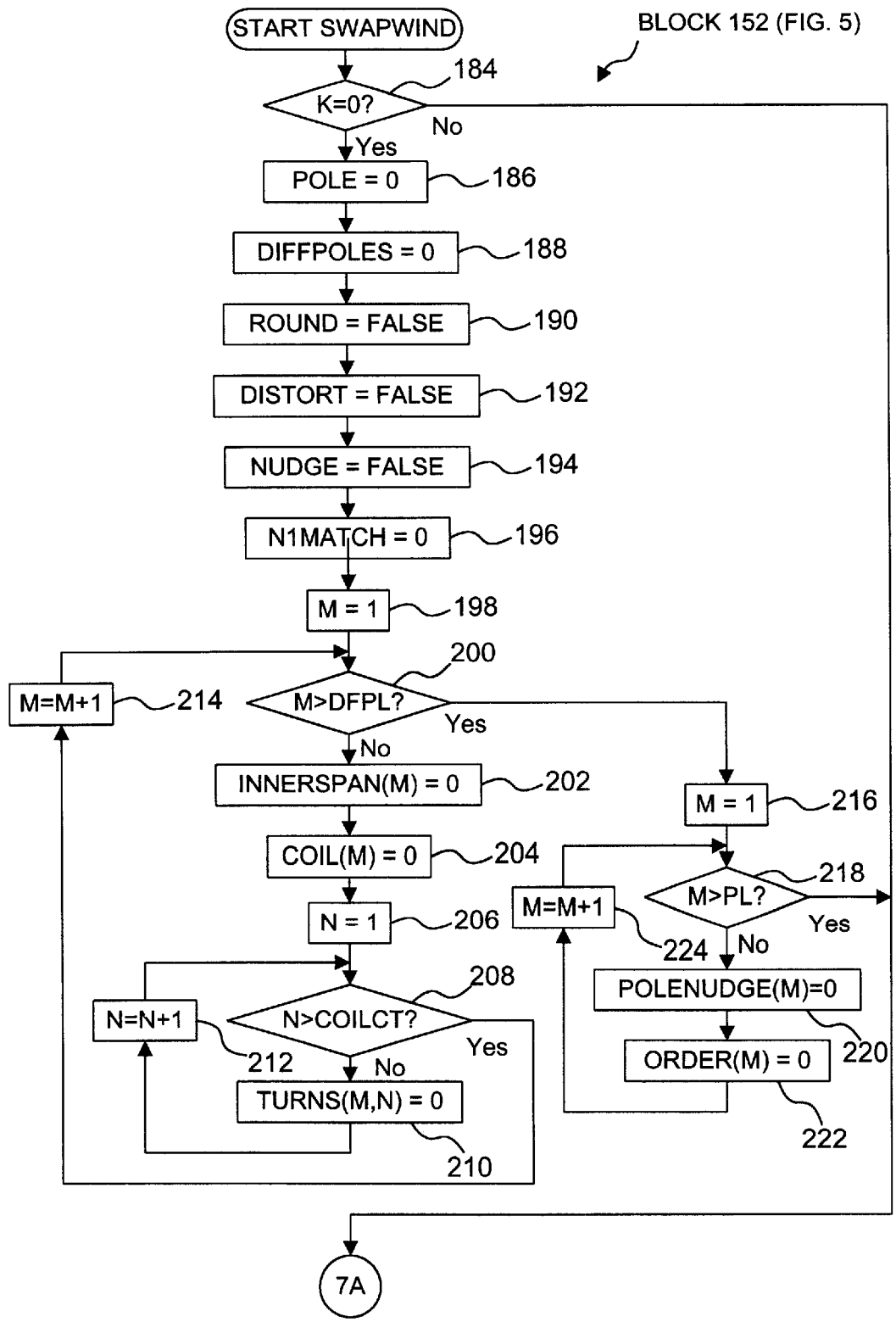
FIGS. 7A–7D, when joined along the similarly lettered lines appearing therein, are a flowchart of one implementation of the subroutine represented by block 152 of FIG. 5.

FIGS. 7A–7D, when joined along the similarly lettered lines appearing therein, form a flowchart illustrating the SWAPWIND subroutine called by the block 152 (FIG. 5), as described above. As shown in FIG. 7A, a block 184 tests whether K is equal to zero. If not, then the programming represented by the remainder of FIG. 7A is bypassed, and control passes directly to a block 226 shown in FIG. 7B. On the other hand, if the block 184 determines that K is equal to zero, then a block 186 sets POLE equal to zero; a block 188 sets DIFFPOLES equal to zero; a block 190 sets ROUND equal to FALSE; a block 192 sets DISTORT equal to FALSE; a block 194 sets NUDGE equal to FALSE, and a block 196 sets N1MATCH equal to zero.

Thereafter, a block 198 initializes a loop-counter variable M to 1, and a block 200 determines whether M exceeds DFPL. If not, then a block 202 sets INNERSPAN(M) equal to zero, a block 204 sets COIL(M) equal to zero, and a block 206 sets loop-counter variable N equal to one. A block 208 then determines whether N exceeds COILCT. If not, then a block 210 sets TURNS(M,N) equal to zero, a block 212 increments the value of N by one, and control returns to the block 208. When the block 208 determines that N does exceed COILCT, a block 214 increments M by one, and control returns to the block 200.

When the block 200 determines that M exceeds DFPL, then a block 216 re-initializes loop-counter variable M to one, and a block 218 determines whether M exceeds PL. If not, then a block 220 sets POLENUDGE(M) equal to zero, a block 222 sets ORDER(M) equal to zero, a block 224 increments M by one, and control returns to the block 218. When the block 218 determines that M exceeds PL, control passes to the block 226 of FIG. 7B.

Figure 7B:
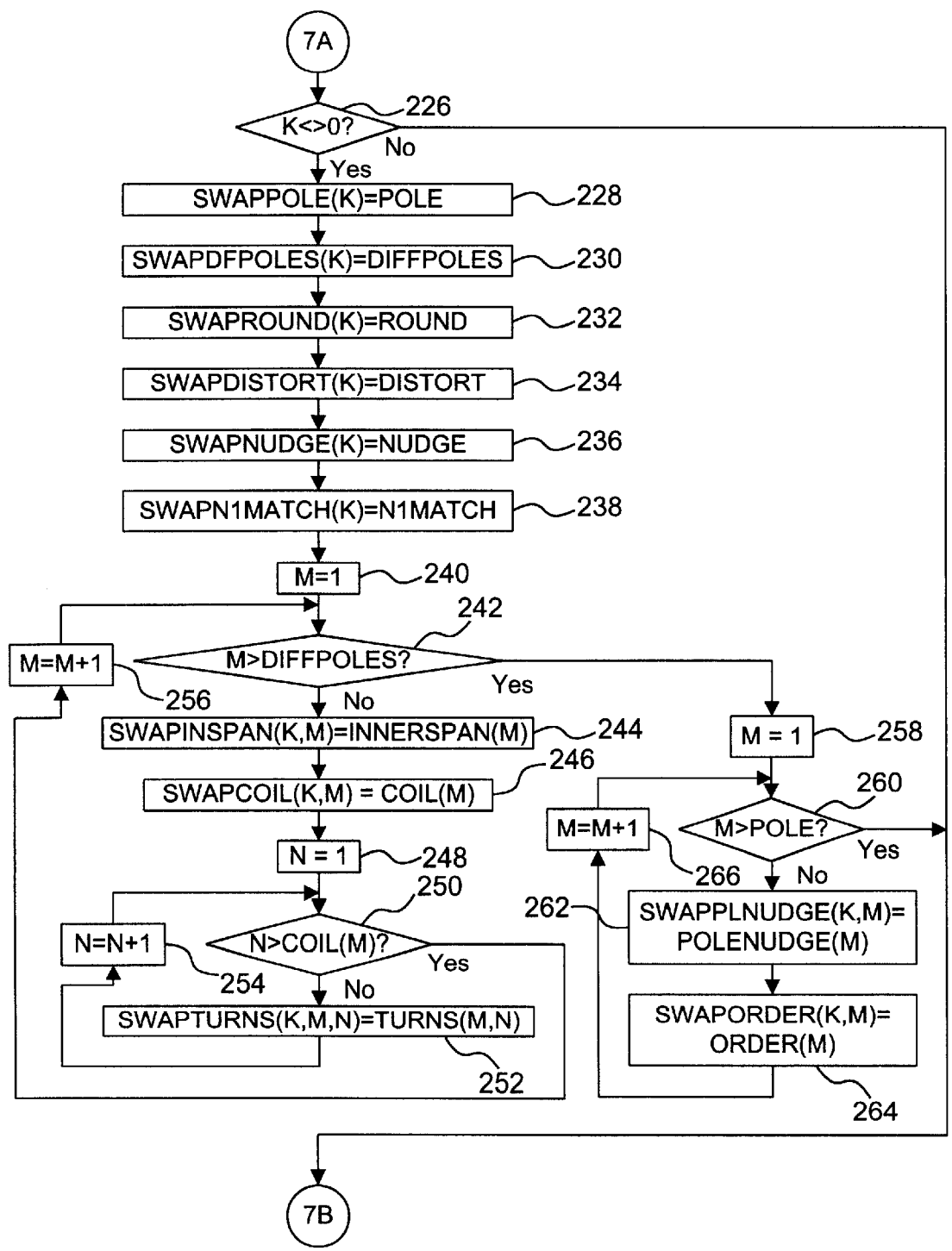

The block 226 determines whether K is not equal to zero. If not (i.e., if the programming of blocks 186–224 of FIG. 7A was executed), then the programming represented by the remainder of FIG. 7B is bypassed, and control passes to a block 268 (described below in connection with FIG. 7C). If the block 226 determines that K has a non-zero value, then a block 228 sets SWAPPOLE(K) equal to POLE; a block 230 sets SWAPDFPOLES(K) equal to DIFFPOLES; a block 232 sets SWAPROUND(K) equal to ROUND; a block 234 sets SWAPDISTORT(K) equal to DISTORT; a block 236 sets SWAPNUDGE(K) equal to NUDGE; a block 238 sets SWAPN1MATCH(K) equal to N1MATCH; and a block 240 sets M equal to one.

A block 242 then determines whether M exceeds DIFFPOLES. If not, then a block 244 sets SWAPINSPAN(K,M) equal to INNERSPAN(M); a block 246 sets SWAPCOIL(K, M) equal to COIL(M), and a block 248 sets N equal to one. A block 250 then determines whether N exceeds COIL(M). If not, then a block 252 sets SWAPTURNS(K,M,N) equal to TURNS(M,N), a block 254 increments N by one, and control returns to the block 250. When the block 250 determines that N exceeds COIL(M), a block 256 increments M by one, and control returns to the block 242. When the block 242 determines that M exceeds DIFFPOLES, a block 258 re-initializes M to one, and a block 260 determines whether M exceeds POLE. If not, then a block 262 sets SWAPPLNUDGE(K,M) equal to POLENUDGE(M), a block 264 sets SWAPORDER(K,M) equal to ORDER(M), a block 266 increments M by one, and control returns to the block 260. When the block 260 determines that M exceeds PL, control passes to the block 268 of FIG. 7C.

Figure 7C:
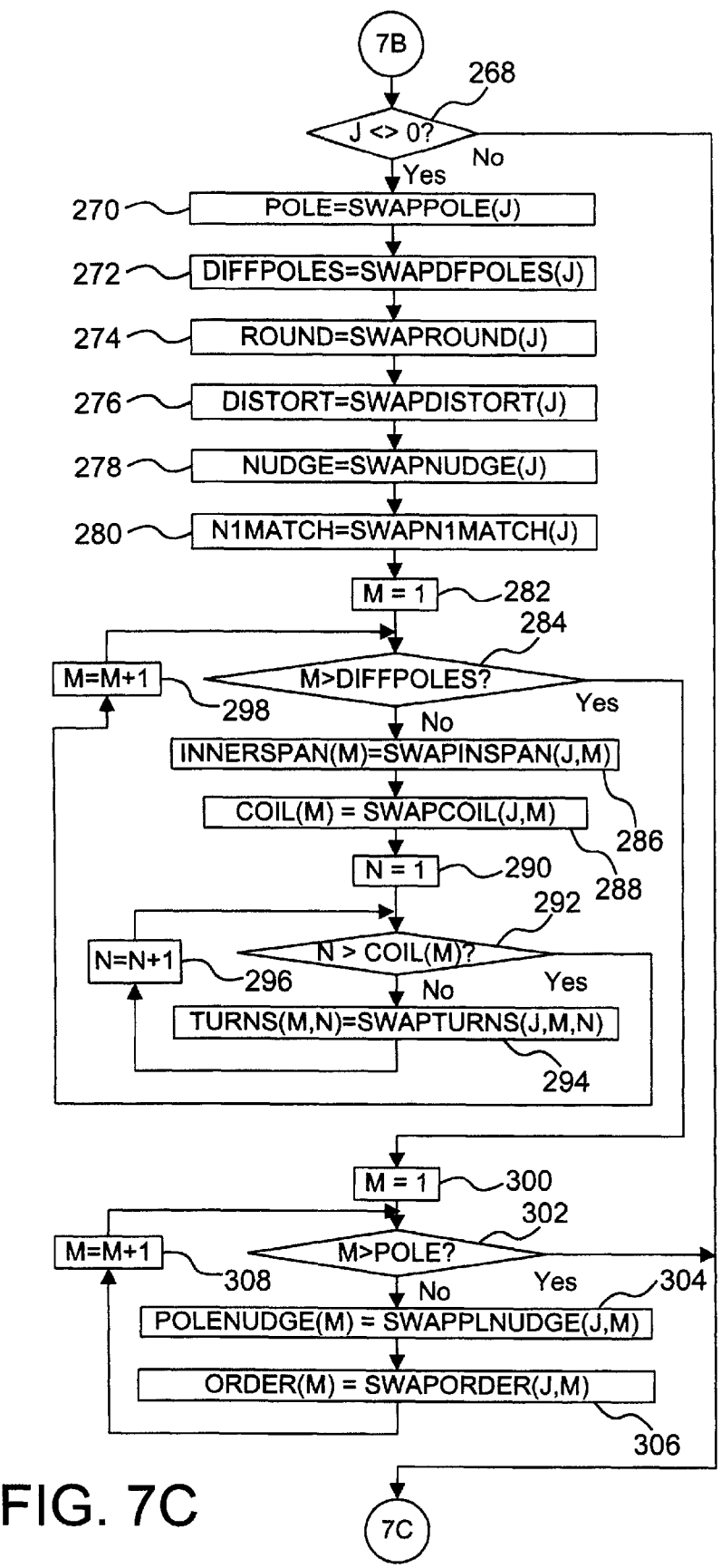

The block 268 determines whether J has a non-zero value. If not, then the programming represented by the remainder of FIG. 7C is bypassed, and control passes to a block 320 (described below in connection with FIG. 7D). If the block 268 determines that J has a non-zero value, then a block 270 sets POLE equal to SWAPPOLE(J); a block 272 sets DIFFPOLES equal to SWAPDFPOLES(J); a block 274 sets ROUND equal to SWAPROUND(J); a block 276 sets DISTORT equal to SWAPDISTORT(J); a block 278 sets NUDGE equal to SWAPNUDGE(J); a block 280 sets N1MATCH equal to SWAPN1MATCH(K); and a block 282 sets M equal to one.

A block 284 then determines whether M exceeds DIFFPOLES. If not, then a block 286 sets INNERSPAN(M) equal to SWAPINSPAN(J,M); a block 288 sets COIL(M) equal to SWAPCOIL(J,M), and a block 290 sets N equal to one. A block 292 then determines whether N exceeds COIL(M). If not, then a block 294 sets TURNS(M,N) equal to SWAPTURNS(J,M,N), a block 296 increments N by one, and control returns to the block 290. When the block 290 determines that N exceeds COIL(M), a block 298 increments M by one, and control returns to the block 284. When the block 284 determines that M exceeds DIFFPOLES, a block 300 re-initializes M to one, and a block 302 determines whether M exceeds POLE. If not, then a block 304 sets POLENUDGE(M) equal to SWAPPLNUDGE(J,M), a block 306 sets ORDER(M) equal to SWAPORDER(J,M), a block 308 increments M by one, and control returns to the block 302. When the block 302 determines that M exceeds POLE, control passes to the block 310 of FIG. 7D.

Figure 7D:
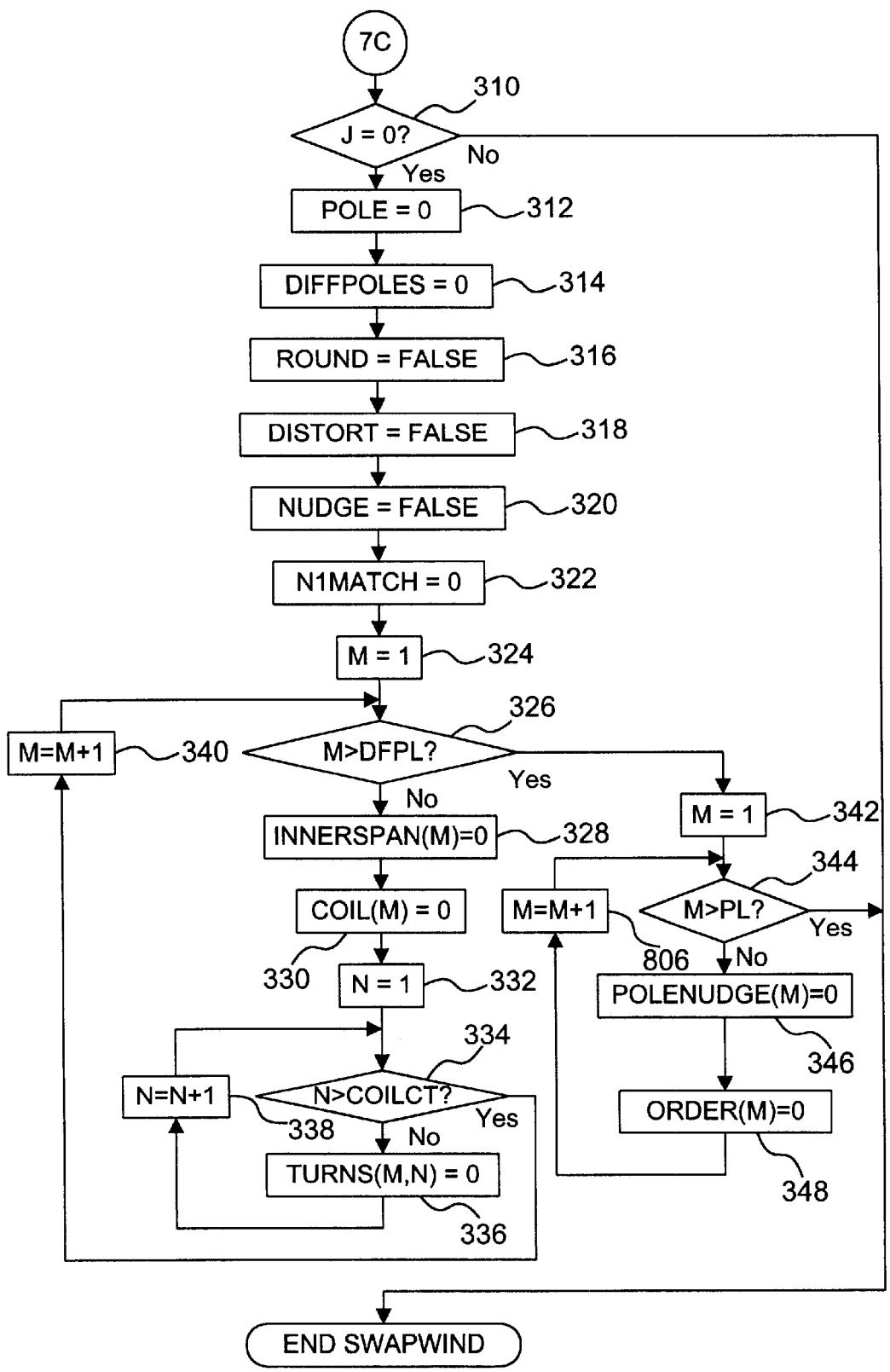

As shown in FIG. 7D, the block 310 tests whether J is equal to zero. If not, then the programming represented by the remainder of FIG. 7D is bypassed, execution of the SWAPWIND subroutine ends, and control returns to the block 156 shown in FIG. 5. On the other hand, if the block 310 determines that J is equal to zero, then a block 312 sets POLE equal to zero; a block 314 sets DIFFPOLES equal to zero; a block 316 sets ROUND equal to FALSE; a block 318 sets DISTORT equal to FALSE; a block 320 sets NUDGE equal to FALSE, and a block 322 sets N1MATCH equal to zero.

Thereafter, a block 324 initializes a loop-counter variable M to 1, and a block 326 determines whether M exceeds DFPL. If not, then a block 328 sets INNERSPAN(M) equal to zero, a block 330 sets COIL(M) equal to zero, and a block 332 sets loop-counter variable N equal to one. A block 334 then determines whether N exceeds COILCT. If not, then a block 336 sets TURNS(M,N) equal to zero, a block 338 increments the value of N by one, and control returns to the block 334. When the block 334 determines that N does exceed COILCT, a block 340 increments M by one, and control returns to the block 326.

When the block 326 determines that M exceeds DFPL, then a block 342 re-initializes loop-counter variable M to one, and a block 344 determines whether M exceeds PL. If not, then a block 346 sets POLENUDGE(M) equal to zero, a block 348 sets ORDER(M) equal to zero, a block 350 increments M by one, and control returns to the block 344. When the block 344 determines that M exceeds PL, execution of the SWAPWIND subroutine ends, and control returns to the block 154 of FIG. 5.

The PLACEWINDING subroutine called by the block 156 of FIG. 5 is illustrated by the flowchart of FIGS. 8–11 and is now described in detail. The variables, arrays, and constants used by the main PLACEWINDING subroutine illustrated in FIG. 8 are described in the following table.

| VARIABLE | DESCRIPTION |
| --- | --- |
| AMPDIST( ) | Array which stores for each stator slot of the particular motor design the number of turns in that stator slot, with sign indicating direction of current flow |
| COIL( ) | Array which stores for each distinct pole of the active winding the number of coils [00a3]or that distinct pole in the particular motor design |
| COILCNTR( ) | Array which stores for each pole of the particular motor design the integer stator slot number corresponding to the physical center of the coils of that pole (assuming the coils of the pole are wound concentrically) |
| DIFFPOLES | Variable which stores the number of distinct poles in the active stator winding |
| DISTORT | Boolean flag variable indicating whether active winding should be based on a predetermined, explicitly provided winding distribution or should instead be based on a winding distribution calculated on the basis of the sinusoidal winding distribution |
| INNERSPAN( ) | Array which stores for each distinct pole of the active winding the number of stator teeth spanned by the innermost coil of that distinct pole in the particular motor design |
| J | Loop counter and/or array-index variable |
| K | Loop counter and/or array-index variable |
| LSLOT(X,Y) | Array which stores for each coil Y of each |

-continued

| VARIABLE | DESCRIPTION |
| --- | --- |
|  | pole X of the particular motor design the slot number containing the left-hand coil side of that coil |
| N1MATCH | Variable which stores the desired effective fundamental number of turns in the active winding |
| N1TRUE | Variable which stores the actual effective fundamental number of turns in the active winding |
| NUMCOILS( ) | Array which stores for each pole of the particular motor design the number of coils making up that pole |
| ORDER( ) | Array which stores placement of distinct poles of the active winding about the stator |
| PERCENTX1D | Variable which stores the percentage of flux attributable to harmonic leakage |
| POLE | Variable which stores the number of poles in the active stator winding |
| POLENUDGE( ) | Array which stores for each pole of the active winding the number of stator slots by which that pole is nudged off center (to the right if positive and to the left if negative) |
| ROUND | Boolean flag variable indicating whether numbers of turns should be rounded off to integers |
| RSLOT | Array which stores for each coil Y of each pole X of the particular motor design the slot number containing the right-hand coil side of that coil |
| S1 | Variable which stores the number of stator slots in the particular motor design |
| S1PPL | Variable which stores the number of stator slots per pole in the particular motor design |
| SHIFT | Array which stores for each winding of the particular motor design the number of stator slots by which that winding is shifted from a reference stator slot of the stator |
| SLTRN( ) | Array which stores for each stator slot of the particular motor design the number of turns occupying that stator slot |
| SPATIAL | Loop counter and/or array-index variable |
| THSPAN( ) | Array which stores for each pole of the particular motor design the number of stator slots spanned by the innermost coil of that pole |
| TURNS(M,N) | Array which stores for each coil N of each distinct pole M in the particular motor design the number of turns in that coil of that distinct pole |
| WIND1( ) | Array which temporarily stores the turn distribution of a winding under consideration |
| WINDDIST(X,Y) | Array which stores for each coil Y of each pole X in the particular motor design the number of turns making up that coil of that pole |

Figure 8A:
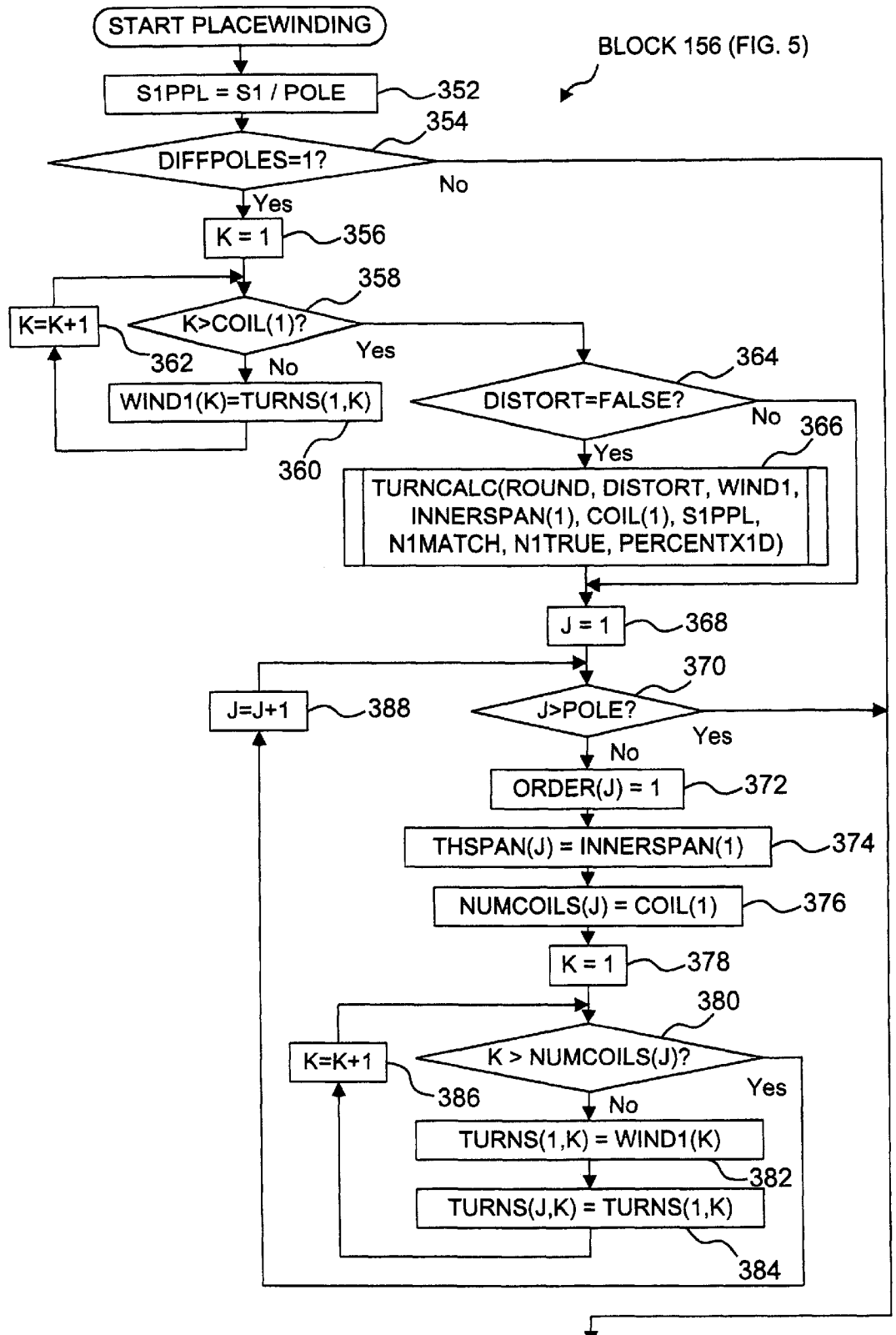
FIGS. 8A–8B, when joined along the similarly lettered lines appearing therein, are a flowchart of one implementation of the subroutine represented by block 156 of FIG. 5.

As shown in FIG. 8A, a block 352 sets S1PPL equal to S1 divided by POLE. A block 354 then determines whether DIFFPOLES is equal to one. If not, then the programing represented by the remainder of FIG. 8A is bypassed, and control passes to a block 390 shown in FIG. 8B. If the block 352 determines that DIFFPOLES is equal to one, then a block 356 sets a loop-counter variable K equal to one, and a block 358 tests whether K exceeds COIL(1). If not, then a block 360 sets WIND1(K) equal to TURNS(1,K), a block 362 increments K by one, and control returns to the block 358. When the block 358 determines that K exceeds COIL (1), a block 364 determines whether DISTORT has a value of FALSE. If so, then a block 366 executes a subroutine called TURNCALC, which is described in detail below in connection with FIGS. 9A–9D. Thereafter, control passes to a block 368, which sets a loop-counter variable J to one. If the block 364 determines that DISTORT is not FALSE, the block 366 is bypassed, and control passes directly to the block 368.

A block 370 then determines whether J exceeds POLE. If so, the programming represented by the remainder of FIG. 8A is bypassed, and control passes to the block 390 of FIG. 8B. If the block 370 determines that J does not exceed pole, then a block 372 sets ORDER(J) equal to one, a block 374 sets THSPAN(J) equal to INNERSPAN(1), a block 376 sets NUMCOILS(J) equal to COIL(1), and a block 378 sets K equal to 1. A block 380 then determines whether K exceeds NUMCOILS(J). If so, then a block 382 sets TURNS(1,K) equal to WIND1(K), a block 384 sets TURNS(J,K) equal to TURNS(1,K), a block 386 increments K by one, and control returns to the block 380. When the block 380 determines that K exceeds NUMCOILS(J), a block 388 increments J by one, and control returns to the block 370, which again tests whether J exceeds POLE as described above.

Figure 8B:
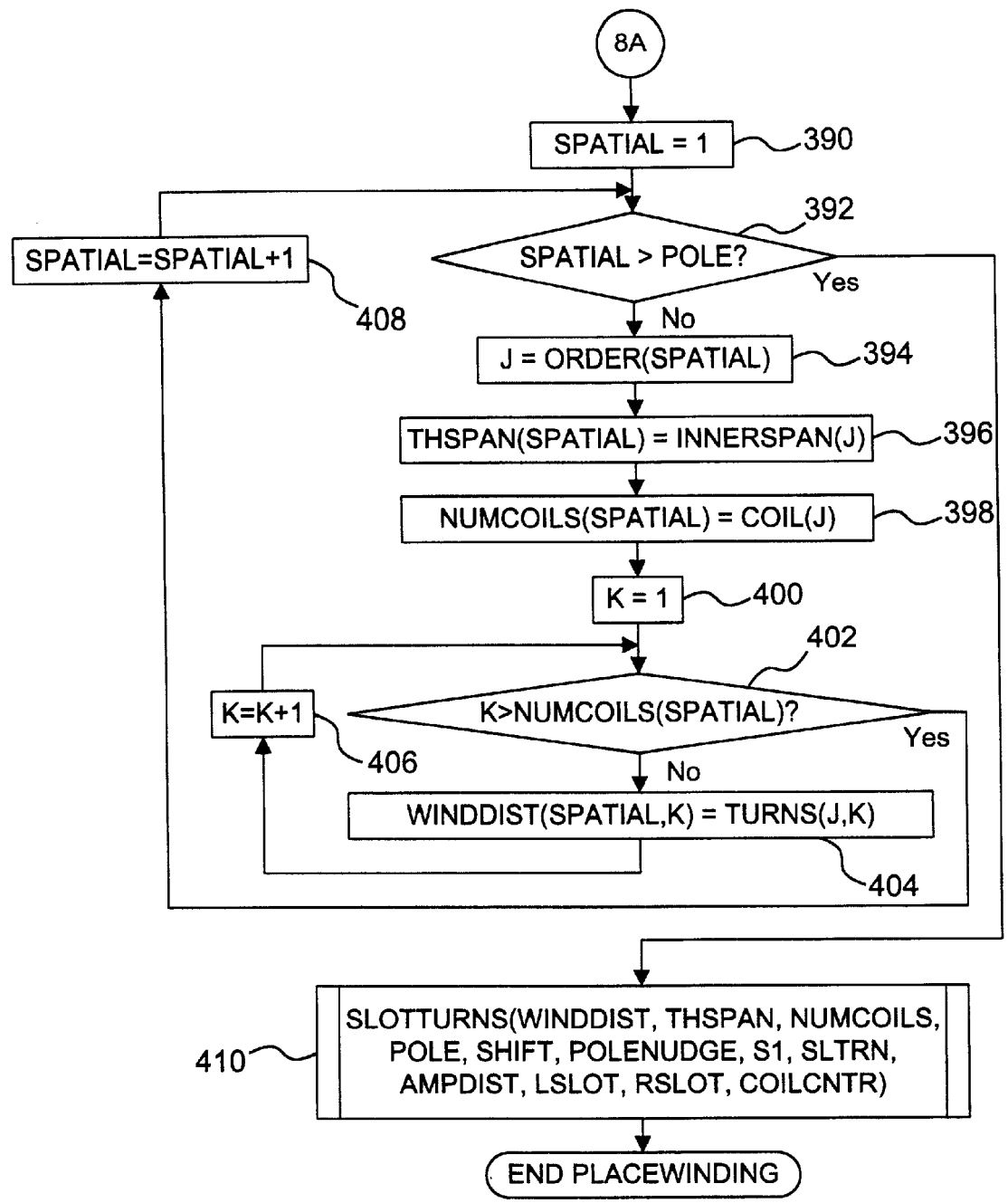

The block 390 in FIG. 8B sets a loop-counter variable SPATIAL equal to one. A block 392 then determines whether SPATIAL exceeds POLE. If not, then a block 394 sets J equal to ORDER(SPATIAL), a block 396 sets THSPAN (SPATIAL) equal to INNERSPAN(J), a block 398 sets NUMCOILS(SPATIAL) equal to COIL(J), and a block 400 sets K equal to one. A block 402 then determines whether K exceeds NUMCOILS(SPATIAL). If not, a block 404 sets WINDDIST(SPATIAL,K) equal to TURNS(J,K), a block 406 increments K by one, and control returns to the block 402. When the block 402 determines that K exceeds NUMCOILS(SPATIAL), a block 408 increments SPATIAL by one, and control returns to the block 392. When the block 392 determines that SPATIAL exceeds POLE, control passes to a block 410, which executes a subroutine referred to as SLOTTURNS, which is described in detail below in connection with the flowchart of FIGS. 11A–11C. Thereafter, execution of the PLACEWINDING subroutine of FIGS. 8A–8B ends, and control returns to the block 158 of FIG. 5.

The TURNCALC subroutine called by the block 366 of FIG. 8A as described above is now described in detail with reference to the flowcharts of FIGS. 9A–9D. The variables, arrays, and constants used by the TURNCALC subroutine are described in the following table.

| VARIABLE | DESCRIPTION |
| --- | --- |
| COILS | Variable which stores the number of coils in a particular pole of a particular winding under consideration |
| DISTORT | Boolean flag variable indicating whether active winding should be based on a predetermined, explicitly provided winding distribution or should instead be based on a winding distribution calculated on the basis of the sinusoidal winding distribution |
| FUND | Variable which stores the actual effective fundamental number of turns making up a given winding distribution prior to any rounding off of the distribution |
| INNERSPAN | Array which stores for each distinct pole of the active winding the number of stator teeth spanned by the innermost coil of that distinct pole in the particular motor design |
| J | Loop counter and/or array-index variable |
| K() | Array which stores for each coil of a particular pole under consideration the fraction KNUMER( )/KDENOM, except when the winding is distorted, in which case it stores a given value representing the desired distribution of turns in the coils of a particular pole under consideration |
| KDENOM | Variable used to tally sum of contents of KNUMER() array elements for all coils of a particular pole under consideration |
| KNUMER() | Array which stores for each coil making up a particular pole under consideration the sine of the half-angle spanned by that coil, except when two coils of adjacent poles occupy a common slot, in which case it stores half of that value |
| N | Loop counter and/or array-index variable |
| N1TRUE | Variable which stores the actual effective fundamental number of turns in the active winding |
| PERCENTX1D | Variable which stores the percentage of flux attributable to harmonic leakage |
| ROUND | Boolean flag variable indicating whether numbers of turns should be rounded off to integer values |
| S1PPL | Variable which stores the number of stator slots per pole in the particular motor design |
| SPAN() | Array which stores for each coil of a particular winding the number of stator teeth spanned by that coil |
| SPANINCR | Variable used to store incremental difference between consecutive elements of array SPAN() |
| THETA() | Array which stores for each coil in the pole under consideration the angle in electrical degrees spanned by that coil |
| TOL2 | Multi-purpose parameter used to store a tolerance value |
| TRNCNT() | Array which stores for each coil in the pole under consideration the number of turns making up that coil |
| TURNSFUNCT | Variable which stores a sum over all coils of a particular pole under consideration of the product of SPANINCR for that coil and the square of TURNSUM for that coil |
| TURNSUM | Variable which stores the sum of all of the turns of a particular pole under consideration that contribute to the flux encircled by a specific coil |
| WIND() | Array which stores for each coil of a particular pole the number of turns making up that coil |

Figure 9A:
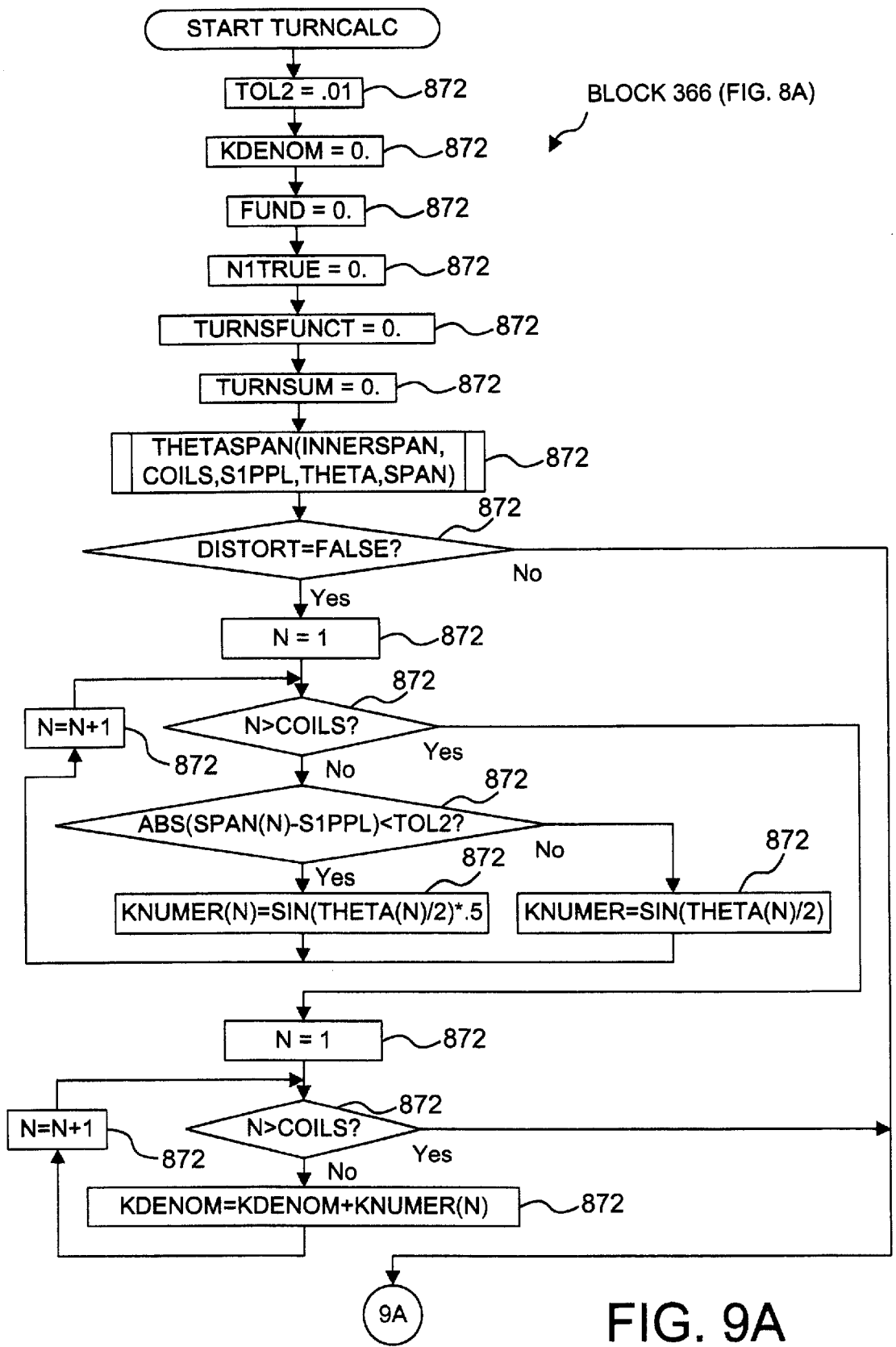
FIGS. 9A–9D, when joined along the similarly lettered lines appearing therein, are a flowchart of one implementation of the subroutine represented by block 366 of FIG. 8A.
Figure 9B:
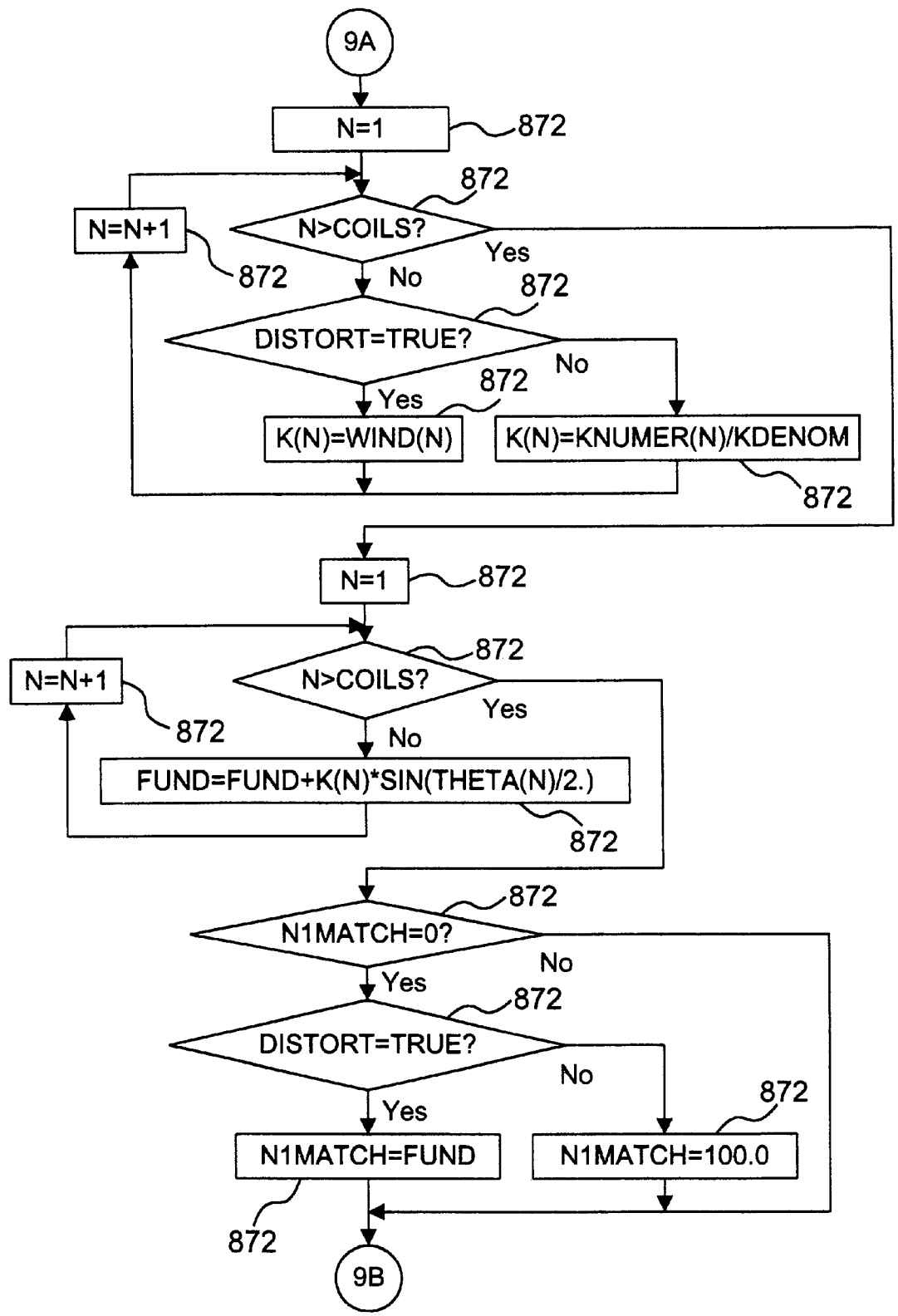

As shown in FIG. 9A, a block 412 sets TOL2 equal to 0.01, a block 414 sets KDENOM equal to zero, a block 416 sets FUND equal to zero, a block 418 sets N1TRUE equal to zero, a block 420 sets TURNSFUNCT equal to zero, and a block 422 sets TURNSUM equal to zero. A block 424 then executes a subroutine referred to as THETASPAN, which is described in detail below in connection with the flowchart of FIG. 10.

Thereafter, a block 426 determines whether DISTORT has a value of FALSE. If not, the programming represented by the remainder of the flowchart of FIG. 9A is bypassed, and control passes to a block 448 of FIG. 9B. If the block 426 determines that DISTORT does have a value of FALSE, then a block 428 sets a loop-counter variable N equal to 1, and a block 430 determines whether N exceeds COILS. If not, a block 432 determines whether the absolute value of the difference between SPAN(N) and S1PPL is less than TOL2. If so, a block 434 sets KNUMER(N) equal to 0.5 times the sine of THETA(N)/2. If not, a block 438 sets KNUMER(N) equal to the sine of THETA(N)/2. In either case, a block 436 then increments N by one, and control returns to the block 430. When the block 430 determines that N exceeds COILS, control passes to a block 440.

The block 440 sets N equal to one, and a block 442 determines whether N exceeds COILS. If not, a block 444 sets KDENOM equal to the sum of KDENOM and KNUMER(N), a block 446 increments N by one, and control returns to the block 442. When the block 442 determines that N exceeds COILS, control passes to the block 448 of FIG. 9B.

Figure 9C:
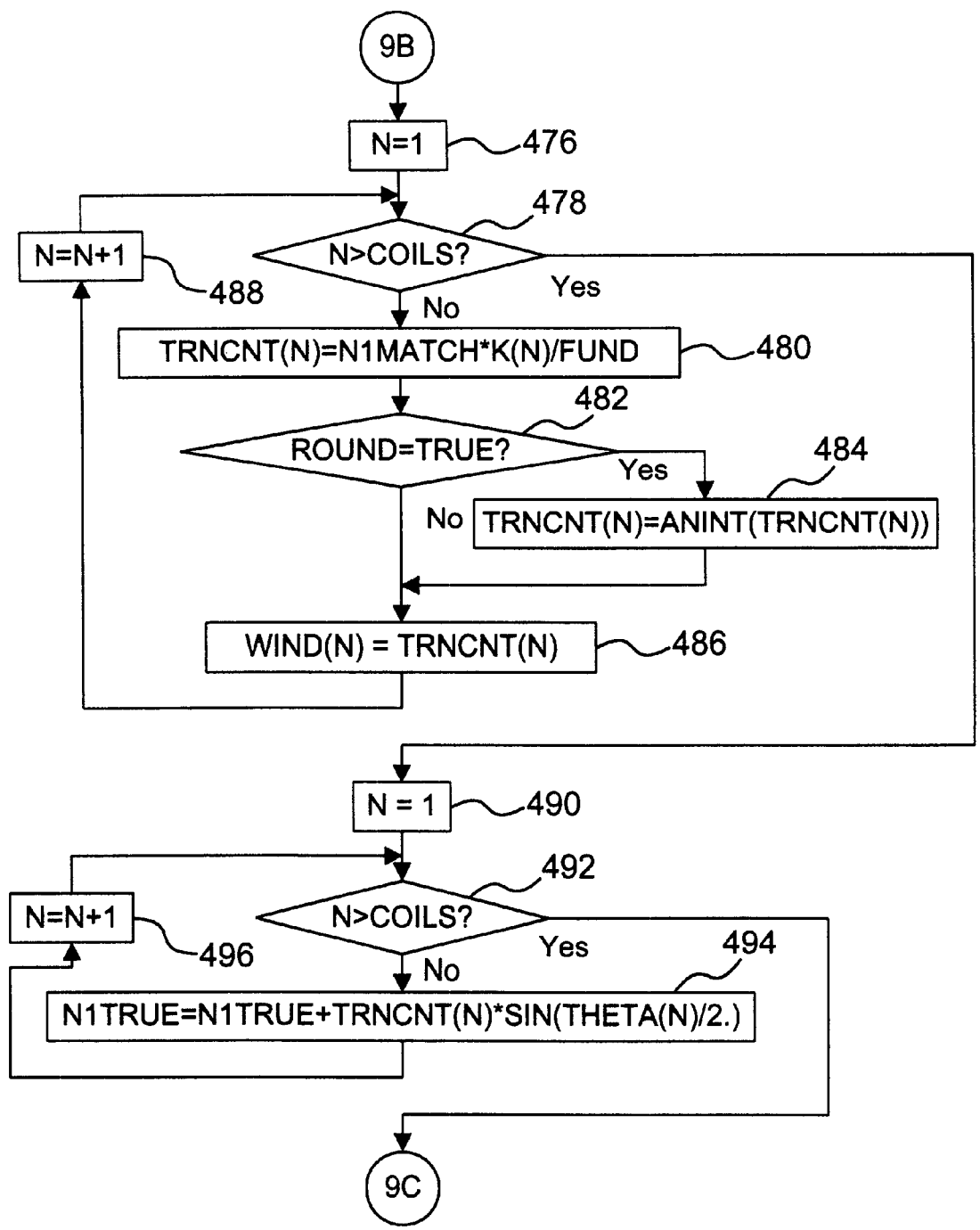

The block 448 sets N equal to one. A block 450 then tests whether N exceeds COILS. If not, a block 452 determines whether DISTORT has a value of TRUE. If so, a block 454 sets K(N) equal to WIND(N). Otherwise, a block 458 sets K(N) equal to KNUMER(N)/KDENOM. In either case, control thereafter passes to a block 456, which increments N by one, and then returns to the block 450. When the block 450 determines that N exceeds COILS, a block 460 sets N equal to one, and a block 462 tests whether N exceeds COILS. If not, a block 464 sets FUND equal to the sum of FUND and the product of K(N) and the sine of THETA(N)/2, a block 466 increments N by one, and control returns to the block 462. When the block 462 determines that N exceeds COILS, a block 468 determines whether N1MATCH is equal to zero. If so, a block 470 determines whether DISTORT has a value of TRUE. If so, a block 472 sets N1MATCH equal to FUND. If not, a block 474 sets N1MATCH equal to 100.0. In either case, control then passes to a block 476 shown in FIG. 9C. If the block 468 determines that N1MATCH is not equal to zero, then the programming represented by the blocks 470–474 (FIG. 9B) is bypassed, and control passes directly to the block 476 (FIG. 9C).

The block 476 sets N equal to one, and a block 478 then determines whether N exceeds COILS. If not, a block 480 sets TRNCNT(N) equal to N1MATCH * K(N)/FUND, and a block 482 determines whether ROUND has a value of TRUE. If so, then a block 484 sets TRNCNT(N) equal to ANINT(TRNCNT(N)), where ANINT is a function that returns the rounded-off value of its single argument, a block 486 sets WIND(N) equal to TRNCNT(N), a block 488 increments N by one, and control returns to the block 478. If the block 482 determines that ROUND does not have a value of TRUE, the block 484 is bypassed and control passes directly to the block 486. When the block 478 determines that N exceeds COILS, control passes to a block 490.

The block 490 sets N equal to one, and a block 492 then determines whether N exceeds COILS. If not, a block 494 sets N1TRUE equal to N1TRUE$^+$ TRNCNT(N)*sin (THETA(N)/2), a block 496 increments N by one, and control returns to the block 492. When the block 492 determines that N exceeds COILS, control passes to a block 498 (FIG. 9D).

Figure 9D:
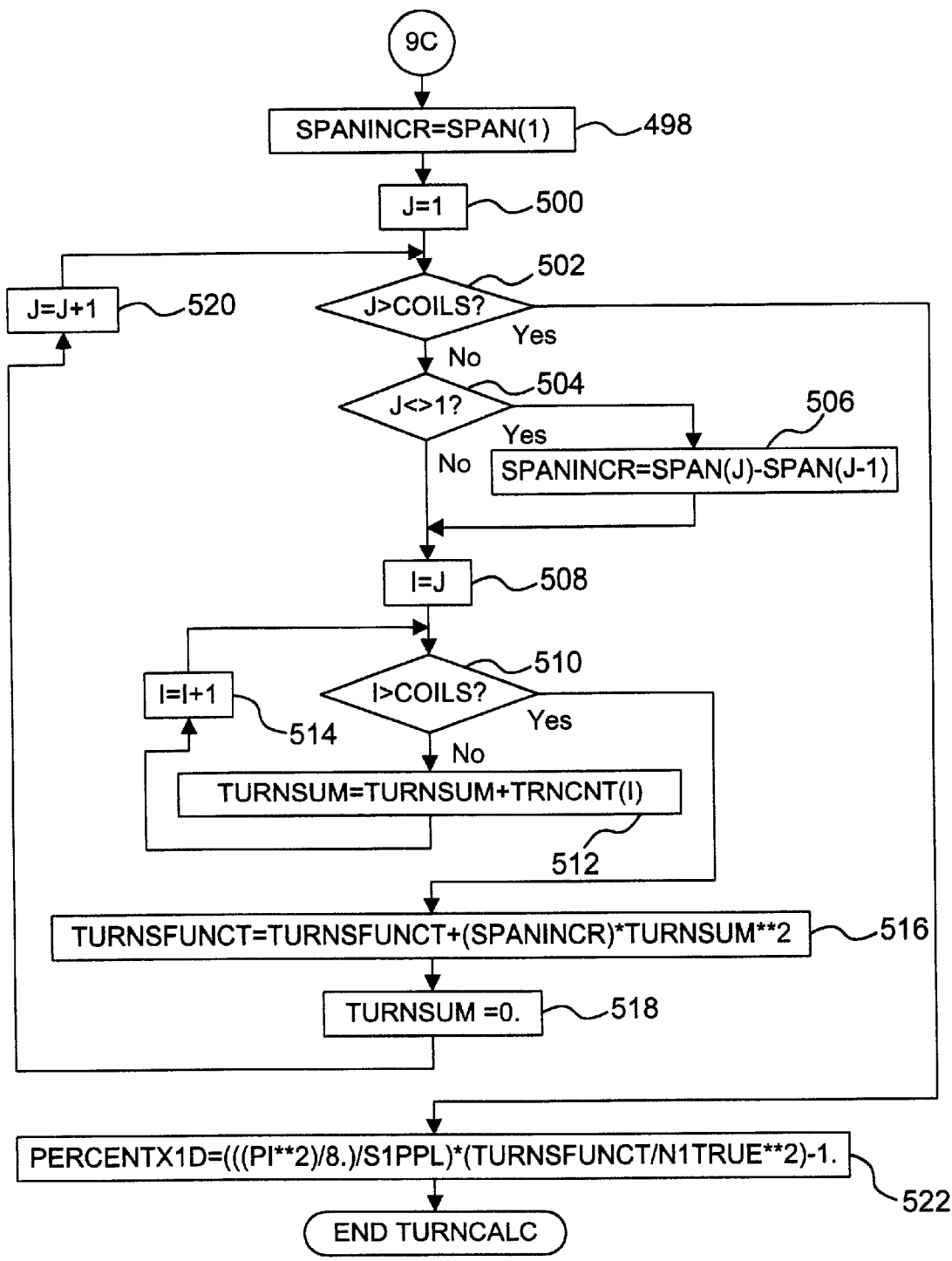

As shown in FIG. 9D, the block 498 sets SPANINCR equal to SPAN(1), a block 500 sets J equal to one, and a block 502 determines whether J exceeds COILS. If not, a block 504 determines whether J has a value other than one. If so, a block 506 sets SPANINCR equal to SPAN(J)–SPAN (J–1), and control then passes to a block 508. If the block 504 determines that J has a value of one, the block 506 is bypassed, and control passes directly to the block 508.

The block 508 sets I equal to J, and a block 510 determines whether I exceeds COILS. If not, a block 512 sets TURNSUM equal to TURNSUM+TRNCNT(I), a block 514 increments I by one, and control returns to the block 510. When the block 510 determines that I exceeds COILS, a block 516 sets TURNSFUNCT equal to TURNSFUNCT+ (SPANINCR)*TURNSUM2, a block 518 sets TURN-SUM equal to zero, a block 520 increments J by one, and control returns to the block 502. When the block 502 determines that J exceeds COILS, a block 522 sets PERCENTX1D equal to (((PI2)/8)/S1PPL)* (TURNSFUNCT/N1TRUE**2)–1, and execution of the TURNCALC subroutine then ends, with control returning to the block 368 of FIG. 8A.

The THETASPAN subroutine called by the block 424 of FIG. 9A as described above is now described in detail with reference to the flowchart of FIG. 10. The variables, arrays, and constants used by the THETASPAN subroutine are described in the following table.

| VARIABLE | DESCRIPTION |
|---|---|
| COIL | Array which stores for each distinct pole of a particular winding being considered the number of coils for that distinct pole in the particular motor design |
| DEG2RAD | Constant multiplier for converting angular quantities from degrees to radians |
| INNERSPAN | Variable which stores for a particular distinct pole being considered the number of stator teeth spanned by the innermost coil of that distinct pole in the particular motor design |
| N | Loop counter and/or array-index variable |
| S1PPL | Variable which stores the number of stator slots per pole in the particular motor design |
| SPAN() | Array which stores for each coil the number of stator teeth spanned by that coil in the particular motor design |
| THETA() | Array which stores for each coil in the pole under consideration the angle in electrical degrees spanned by that coil |

Figure 10:
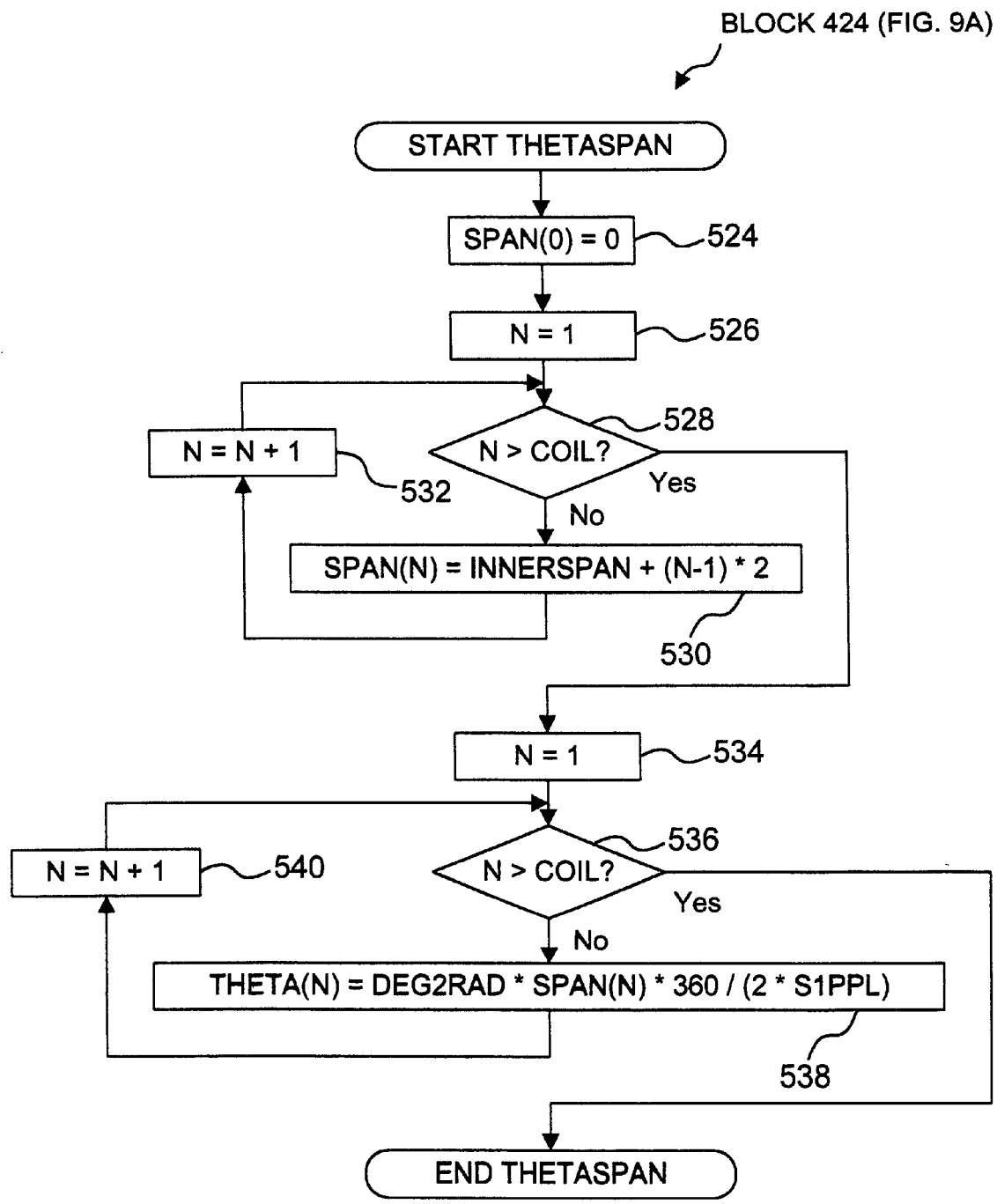
FIG. 10 is a flowchart of one implementation of the subroutine represented by block 424 of FIG. 9A.

As shown in FIG. 10, a block 524 sets SPAN(0) equal to zero, and a block 526 sets N equal to one. A block 528 then determines whether N exceeds COIL. If not, then a block 530 sets SPAN(N) equal to the sum of INNERSPAN and (N−1)*2, a block 532 increments N by one, and control returns to the block 528. When the block 528 determines that N exceeds COIL, a block 534 re-initializes N to one, and a block 536 determines whether N exceeds COIL. If not, a block 538 sets THETA(N) equal to DEG2RAD*SPAN(N) *360/(2*S1PPL), a block 540 increments N by one, and control returns to the block 536. When the block 536 determines that N exceeds COIL, execution of the THETASPAN subroutine represented by the flowchart of FIG. 10 ends, and control returns to the block 426 of FIG. 9A.

The SLOTTURNS subroutine called by the block 410 of FIG. 8B as described above is now described in detail with reference to the flowchart of FIGS. 11A–11C. The variables, arrays, and constants used by the SLOTTURNS subroutine are described in the following table.

| VARIABLE | DESCRIPTION |
|---|---|
| AMPDIST() | Array which stores for each stator slot of the particular motor design the number of turns in that slot, with sign indicating direction of current flow |
| COILCNTR() | Array which stores for each pole of the particular motor design the integer stator slot number corresponding to the physical center of the coils of that pole (assuming the coils of the pole are wound concentrically) |
| COILS() | Array which stores for each pole the number of coils making up that pole |
| COILSLOTL(J,K) | Array which stores for each coil K of each pole J the stator slot number occupied by the left-hand coil side of that coil |
| COILSLOTR(J,K) | Array which stores for each coil K of each pole J the stator slot number occupied by the |

-continued

| VARIABLE | DESCRIPTION |
| --- | --- |
| | right-hand coil side of that coil |
| I | Loop counter and/or array-index variable |
| INNERSPAN() | Array which stores for each distinct pole of the active winding the number of stator teeth spanned by the innermost coil of that distinct pole in the particular motor design |
| J | Loop counter and/or array-index variable |
| K | Loop counter and/or array-index variable |
| OFFTH() | Array which stores for each pole of a winding under consideration one half of the number of stator teeth spanned by the innermost coil of that pole |
| POLE | Variable which stores the number of poles in the active stator winding |
| POLENUDGE() | Array which stores for each pole of the active winding the number of slots that pole is nudged off center (to the right if positive and to the left if negative) |
| S1 | Variable which stores the number of stator slots in the particular motor design |
| SHIFT | Array which stores for each winding of the particular motor design the number of stator slots by which that winding is shifted from a reference stator slot of the stator |
| TURNS() | Array which stores for each stator slot the number of turns occupying that stator slot |
| WINDDIST(J,K) | Array which stores for each coil Y of each pole X in the particular motor design the number of turns making up that coil of that pole |

Figure 11A:
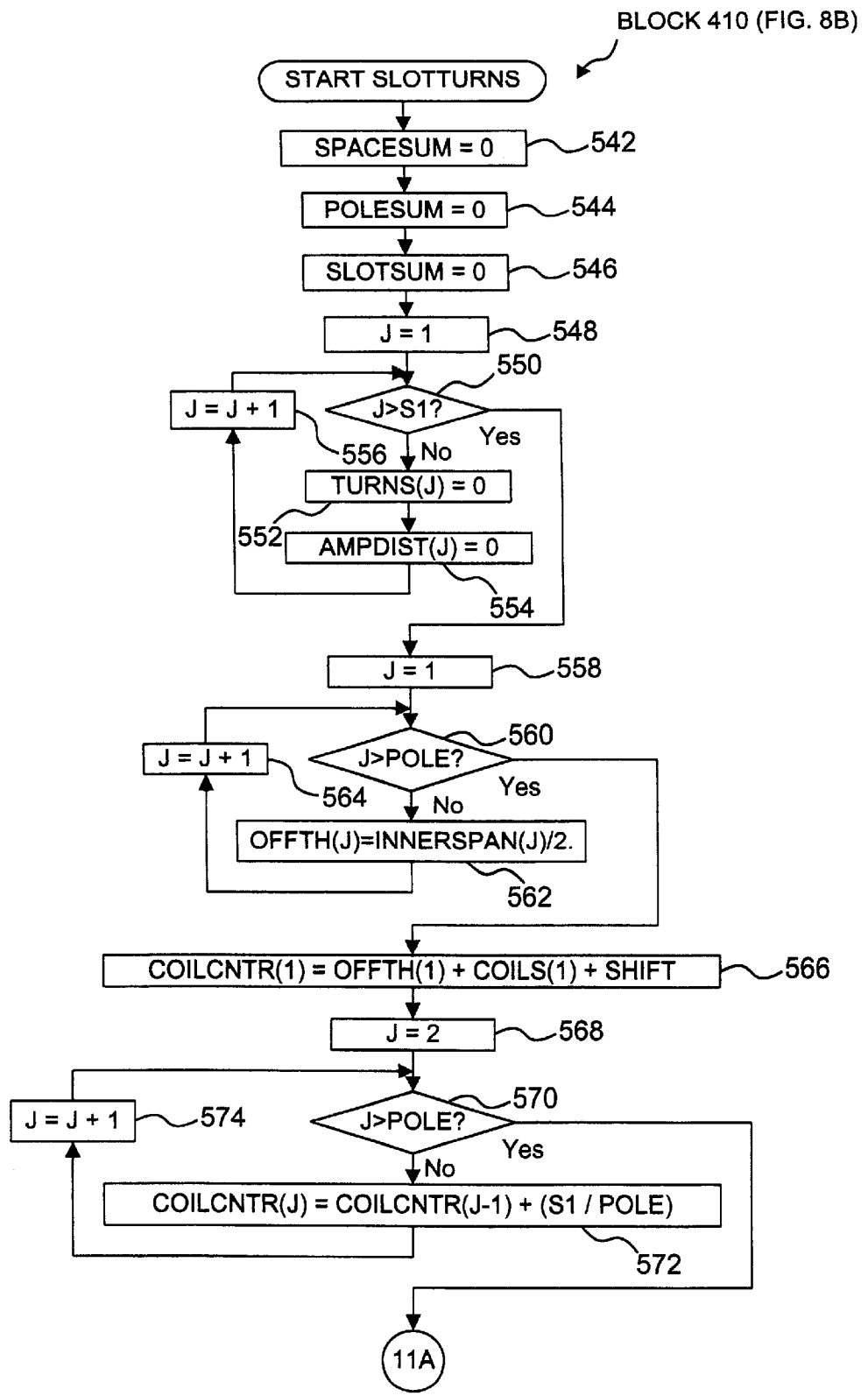
FIGS. 11A–11C, when joined along the similarly lettered lines appearing therein, are a flowchart of one implementation of the subroutine represented by block 410 of FIG. 8B.
Figure 11B:
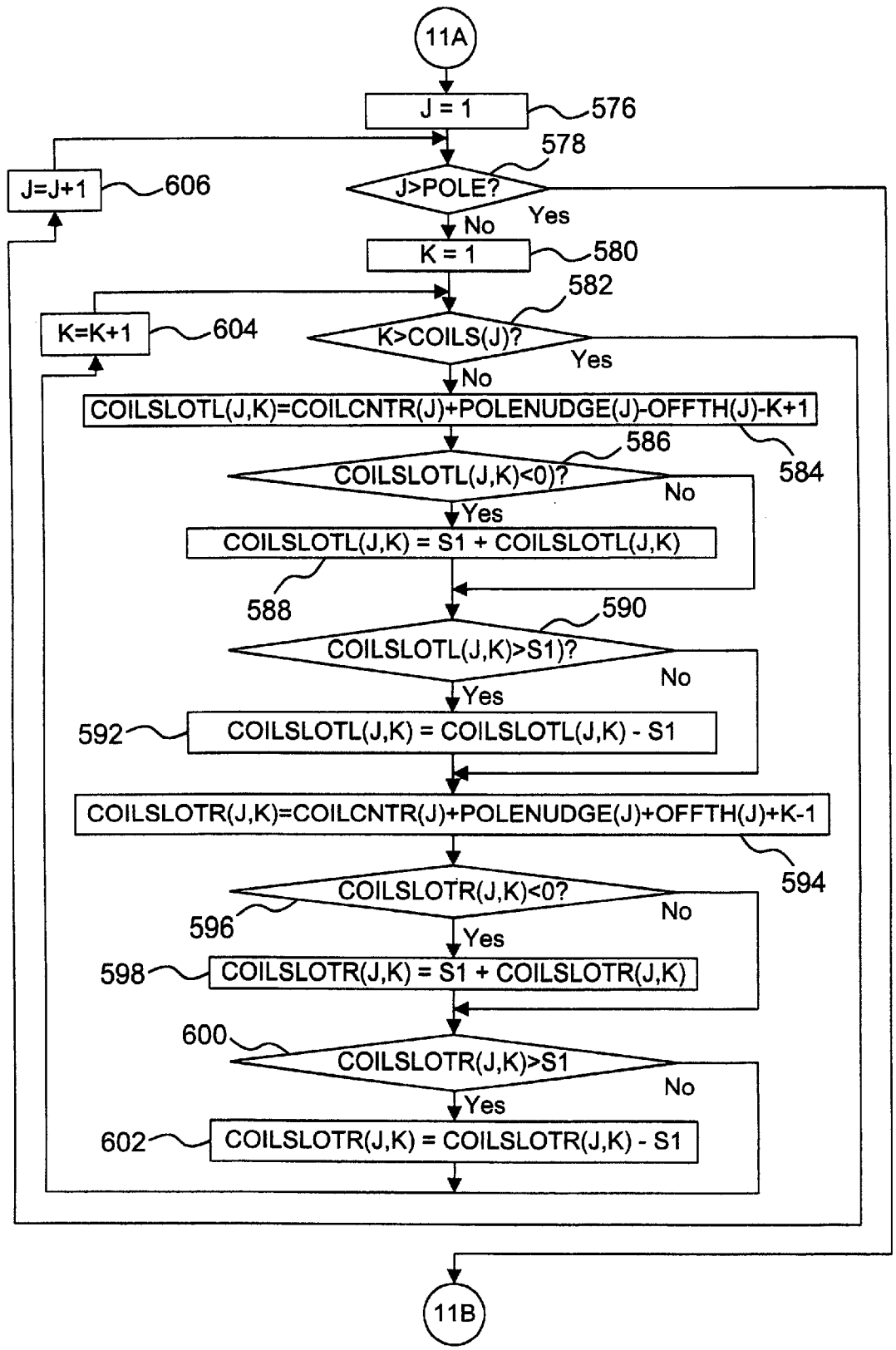
Figure 11C:
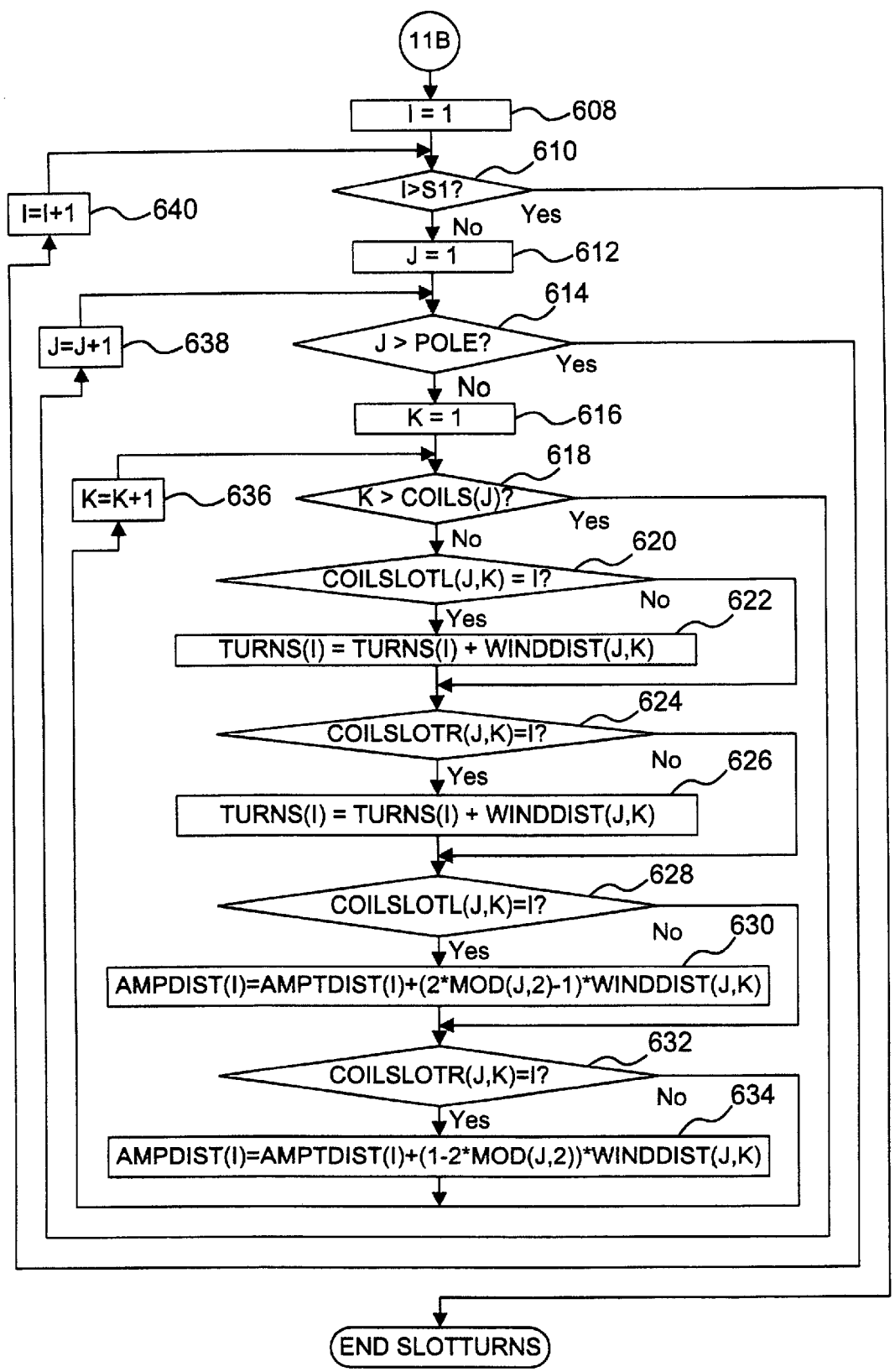

As shown in FIG. 11A, a block 542 sets SPACESUM equal to zero, a block 544 sets POLESUM equal to zero, a block 546 sets SLOTSUM equal to zero, a block 548 sets J equal to one, and a block 550 determines whether J exceeds S1. If not, then a block 552 sets TURNS(J) equal to zero, a block 554 sets AMPDIST(J) equal to zero, a block 556 increments J by one, and control returns to the block 550. When the block 550 determines that J exceeds S1, a block 558 sets J equal to one, and a block 560 determines whether J exceeds POLE. If not, a block 562 sets OFFTH(J) equal to INNERSPAN(J)/2, a block 564 increments J by one, and control returns to the block 560. When the block 560 determines that J exceeds POLE, a block 566 sets COILCNTR(1) equal to OFFTH(1)+COILS(1)+SHIFT, a block 568 sets J equal to two, and a block 570 determines whether J exceeds POLE. If not, a block 572 sets COILCNTR(J) equal to COILCNTR(J−1)+(S1/POLE), a block 574 increments J by one, and control returns to the block 570. When the block 570 determines that J exceeds POLE, control passes to a block 576 shown in FIG. 11B.

The block 576 sets J equal to one, and a block 578 determines whether J exceeds POLE. If and when the block 578 determines that J exceeds POLE, the remaining programming represented by the flowchart of FIG. 11B is bypassed, and control passes to a block 608 shown in FIG. 11C. Otherwise, a block 580 sets K equal to one, and a block 580 determines whether K exceeds COILS(J). If not, a block 584 sets COILSLOTL(J,K) equal to COILCNTR(J)+POLENUDGE(J)−K+1. A block 586 then determines whether COILSLOTL(J,K) has a negative value. If so, a block 588 augments the value of COILSLOTL(J,K) by the value of S1; otherwise, the block 588 is bypassed, and control passes directly to a block 590. The block 590 then determines whether COILSLOTL(J,K) has a value that exceeds S1. If so, then a block 592 reduces the value of COILSLOTL(J,K) by S1; otherwise, the block 592 is bypassed, and control passes to a block 594. The block 594 sets COILSLOTR(J,K) equal to COILCNTR(J)+POLEJUDGE(J)+OFFTH(J)+K−1.

A block 596 then determines whether COILSLOTR(J,K) has a negative value. If so, a block 598 augments the value of COILSLOTR(J,K) by the value of S1; otherwise, the block 598 is bypassed, and control passes directly to a block 600. The block 600 then determines whether COILSLOTR(J,K) has a value that exceeds S1. If so, then a block 602 reduces the value of COILSLOTR(J,K) by S1; otherwise, the block 602 is bypassed, in which case a block 604 increments K by one, and control returns to the block 582. When the block 582 determines that K exceeds COILS(J), a block 606 increments J by one, and control then returns to the block 578.

The block 608 (FIG. 11C) sets I equal to one. Thereafter, a block 610 determines whether I exceeds S1. When the block 610 determines that I does exceed S1, the programming represented by the remainder of the flowchart of FIG. 11C is bypassed, and control returns to the block 158 shown in FIG. 5. In the event that the block 610 determines that I does not exceed S1, a block 612 sets J equal to one, and a block 614 determines whether J exceeds POLE. If not, a block 616 sets K equal to one, and a block 618 determines whether K exceeds COILS(J).

If the block 618 determines that K does not exceed COILS(J), a block 620 determines whether COILSLOTL is equal to I. If so, a block 622 augments the value of TURNS(I) by the value of WINDDIST(J,K); otherwise, the block 622 is bypassed, and control passes to a block 624. The block 624 determines whether COILSLOTR(J,K) is equal to I. If so, a block 626 augments the value of TURNS(I) by the value of WINDDIST(J,K); otherwise, the block 626 is bypassed, and control passes to a block 628. The block 628 determines whether COILSLOTL(J,K) is equal to I. If so, a block 630 augments the value of AMPDIST(I) by the product of (2*MOD(J,2)−1) and WINDDIST(J,K), where the expression MOD(J,2) is the remainder resulting from dividing J by 2 (sometimes read "J modulo 2"). If the block 628 determines that COILSLOTL (J,K) is not equal to I, then the block 630 is bypassed, and control passes directly to a block 632. The block 632 determines whether COILSLOTR(J,K) is equal to I. If so, a block 634 augments the value of AMPDIST(I) by the product of (1−2*MOD(J,2)) and WINDDIST(J,K), a block 636 increments K by one, and control returns to the block 618. If the block 632 determines that COILSLOTR(J,K) is not equal to I, the block 634 is bypassed, and control passes directly to a block 636.

When the block 618 determines that K exceeds COILS(J), a block 638 increments J by one, and control returns to the block 614. When the block 614 determines that J exceeds POLE, a block 640 increments I by one, and control returns to the block 610. When the block 610 determines that I exceeds S1, execution of the SLOTTURNS subroutine of FIGS. 11A–11C ends, and control returns to the block 158 (FIG. 5), as noted above.

The sub-program called by the block 170 of FIG. 5 (to calculate permeance for all poles of winding J) as described above is now described in detail with reference to the flowchart of FIG. 12. The variables, arrays, and constants used by this sub-program are described in the following table.

| VARIABLE | DESCRIPTION |
|---|---|
| HALFHTLE() | Array which stores for each coil in the particular motor design half of the height in the axial direction of that coil - Lead End |
| HALFHTOE() | Array which stores for each coil in the particular motor design half of the height in the axial direction of that coil - Opposite End |
| K | Loop counter and/or array-index variable |
| L | Loop counter and/or array-index variable |
| NUMCOILS() | Array which stores for each pole of the particular motor design the number of coils making up that pole |
| POLE | Variable which stores the number of poles in the active stator winding |
| POLETURNS() | Array which stores for each pole of the particular motor design the aggregate number of turns making up that pole |
| RBLEAVG() | Array which stores for each coil bundle of the active pole of the active winding in the particular motor design, the average of the equivalent radii (across the slots spanned by that coil bundle) of that coil bundle - Lead End |
| RBOEAVG() | Array which stores for each coil bundle of the active pole of the active winding in the particular motor design, the average of the equivalent radii (across the slots spanned by that coil bundle) of that coil bundle - Opposite End |
| USEDHEIGHTLE | Variable which stores the height of available bundle area occupied by coils below coil under consideration - Lead End |
| USEDHEIGHTOE | Variable which stores the height of available bundle area occupied by coils below coil under consideration - Opposite End |
| WINDDIST(K,L) | Array which stores for each coil Y of each pole X in the particular motor design the number of turns making up that coil of that pole |

As shown in FIG. 12, a block 642 initializes a loop-counter variable K to one, and a block 644 determines whether K exceeds POLE. If not, a block 646 sets the variables USEDHEIGHTLE, USEDHEIGHTOE, and POLETURNS(K) to zero, a block 648 initializes a loop-counter variable L to one, and a block 650 determines whether L exceeds NUMCOILS(K). If not, a block 652 augments the value of POLETURNS(K) by the value of WINDDIST(K,L), a block 654 increments L by one, and control returns to the block 650. When the block 650 determines that L exceeds NUMCOILS(K), a block 656 re-initializes L to one, and a block 658 determines whether L exceeds NUMCOILS(K). If not, a block 660 executes a sub-program which calculates the end-turn leakage reactance for coil L of pole K (as described in detail below in connection with FIGS. 13A–13C). Thereafter, a block 662 augments USEDHEIGHTLE by twice the value of HALFHTLE(L), augments USEDHEIGHTOE by twice the value of HALFHTOE(L), and sets HALFHTLE(L), HALFHTOE(L), RBLEAVG(L), and RBOEAVG(L) to zero. A block 664 then increments L by one, and control returns to the block 658. When the block 658 determines that L exceeds NUMCOILS(L), a block 666 increments K by one, and control returns to the block 644. When the block 644 determines that K exceeds POLE, execution of the sub-program of FIG. 12 ends, and control returns to the block 172 of FIG. 5.

The sub-program called by the block 660 of FIG. 12 (to calculate end-turn leakage reactance for coil L of pole K) as described above is now described in detail in connection with FIGS. 13A–13C. The variables, arrays, and constants used by that sub-program are described in the following table.

| VARIABLE | DESCRIPTION |
|---|---|
| ADEPTHLE() | Variable which stores for each stator slot in the particular motor design the distance from the inner diameter of coil bundle to the inner diameter of the stator for that stator slot - Lead End |
| ADEPTHOE() | Variable which stores for each stator slot in the particular motor design the distance from the inner diameter of coil bundle to the inner diameter of the stator for that stator slot - Opposite End |
| BDEPTHLE() | Variable which stores for each stator slot in the particular motor design the distance from the outer diameter of coil bundle to the outer diameter of the stator for that stator slot - Lead End |
| BDEPTHOE() | Variable which stores for each stator slot in the particular motor design the distance from the outer diameter of coil bundle to the outer diameter of the stator for that stator slot - Opposite End |
| COILPECLE | Variable which stores the individual pole permeance for a particular span of coil bundle under consideration - Lead End |
| COILPECOE | Variable which stores the individual pole permeance for a particular span of coil bundle under consideration - Opposite End |
| COILRADAVGLE | Variable which stores the average distance from the center of the stator bore to the middle of a coil bundle under consideration - Lead End |
| COILRADAVGOE | Variable which stores the average distance from the center of the stator bore to the middle of a coil bundle under consideration - Opposite End |
| COILRADLE() | Array which stores for each stator slot in the particular motor design the distance from the axial center of the stator bore to the middle of the coil bundle occupying the stator slot - Lead End |
| COILRADOE() | Array which stores for each stator slot in the particular motor design the distance from the axial center of the stator bore to the middle of the coil bundle occupying the stator slot - Opposite End |
| CON1 | Constant conversion factor to convert from cgs permeance to SI reactance |
| D1 | Motor-specific constant which stores the inner diameter of the stator in the particular motor design (i.e., the stator bore diameter bordering the motor air gap) |
| D10 | Motor-specific constant which stores the radial distance of the tooth tip for the particular motor design |
| DT() | Motor-specific array which stores for each stator slot of the particular motor design the distance between R11 and R12 for that stator slot |
| HALFHTLE() | Array which stores for each coil in the particular motor design half of the height in the axial direction of that coil - Lead End |
| HALFHTOE() | Array which stores for each coil in the particular motor design half of the height in the axial direction of that coil - Opposite End |
| HEIGHTRATIO | Variable which stores for a particular coil under consideration the assumed height of the endturn bundle for that coil |
| HILE() | Motor-specific array which stores for each stator slot of the particular motor design the distance between the radially innermost end of the coil bundle and the stator for that stator slot - Lead End |
| HIOE() | Motor-specific array which stores for each stator slot of the particular motor design the distance between the radially innermost end |

-continued

| VARIABLE | DESCRIPTION |
|---|---|
| | of the coil bundle and the stator for that stator slot - Opposite End |
| INDEX | Loop counter and/or array-index variable |
| LINKEDTURNS() | Array which stores for each stator slot the number of linked turns associated with each flux tube in the particular motor design |
| LOOP | Loop counter and/or array-index variable |
| LSLOT(K,L) | Array which stores for each coil L of each pole K of the particular motor design the slot number containing the left-hand coil side of that coil |
| M | Loop counter and/or array-index variable |
| MUTUAL | Boolean flag variable used internally within program to select individual-pole (self-reactance) or pole-to-pole (mutual reactance) calculations |
| PEALE(J,M) | Array which stores for each winding J and each stator slot M of the particular motor design the pole-to-pole leakage permeance for that winding at that stator slot - Lead End |
| PEAOE(J,M) | Array which stores for each winding J and each stator slot M of the particular motor design the pole-to-pole leakage permeance for that winding at that stator slot - Opposite End |
| PEC(J,K,L) | Array which stores for each winding J, each pole K, and each coil L of the particular motor design, the net individual pole leakage permeance for that winding, pole, and coil |
| PECLE(K,L) | Array which stores for each pole K and each coil L of a particular winding under consideration in the particular motor design the individual-pole self-leakage permeance for that pole and that coil - Lead End |
| PECLEMUT(K,L,M) | Array which stores for each pair of coils L and M of each pole K of a particular winding under consideration in the particular motor design the pole-to-pole leakage permeance for those coils of that pole - Lead End |
| PECMUT(J,K,L,M) | Array which stores for each pair of coils L and M of each pole K of each winding J of the particular motor design the net within-pole mutual leakage permeance for those coils, pole, and winding |
| PECOE(K,L) | Array which stores for each pole K and each coil L of a particular winding under consideration in the particular motor design the individual-pole self-leakage permeance for that pole and that coil - Opposite End |
| PECOEMUT(K,L,M) | Array which stores for each pair of coils L and M of each pole K of a particular winding under consideration in the particular motor design the pole-to-pole leakage permeance for those coils of that pole - Opposite End |
| PI | The irrational constant $\pi$ equal to approximately 3.14159265358979323842643 |
| POLETURNS() | Array which stores for each pole of the particular motor design the aggregate number of turns making up that pole |
| R11() | Array which stores for each stator tooth (i.e., one for each stator slot) of the particular motor design the radius at the "shoulder" of the tooth tip at that stator tooth |
| RBLE() | Array which stores for each stator tooth of the particular motor design the equivalent radius of the coil bundle over that stator tooth - Lead End |
| RBLEAVG() | Array which stores for each coil bundle of the active pole of the active winding in the particular motor design, the average of the equivalent radii (across the slots spanned by that coil bundle) of that coil bundle - Lead End |
| RBOE() | Array which stores for each stator tooth of the particular motor design the equivalent radius of the coil bundle over that stator tooth - Opposite End |
| RBOEAVG() | Array which stores for each coil bundle of the active pole of the active winding in the particular motor design, the average of the equivalent radii (across the slots spanned by that coil bundle) of that coil bundle - Opposite End |
| RSLOT(K,L) | Array which stores for each coil L of each pole K of the particular motor design the slot number containing the right-hand coil side of that coil |
| S1 | Variable which stores the number of stator slots in the particular motor design |
| SPAN | Variable which stores the number of stator teeth or stator slots spanned by a particular coil under consideration |
| THETAM() | Array which stores for each stator slot of the particular motor design the angle in mechanical radians spanned by the flux tube corresponding to that stator slot |
| THSPAN() | Array which stores for each pole of the particular motor design the number of stator slots spanned by the innermost coil of that pole |
| TIPD | Motor-specific constant which stores the total length of a stator tooth tip |
| TOOTH1() | Array which stores for each stator tooth (i.e., one for each stator slot) the width of that stator tooth |
| W10 | Variable which stores the circumferential width of the stator slot opening (at the air gap) |
| WINDDIST(K,L) | Array which stores for each coil L of each pole K in the particular motor design the number of turns making up that coil of that pole |
| XEC() | Array which stores for each stator winding in the particular motor design the net reactance due to individual pole permeances of the poles of that stator winding |

Figure 13A:
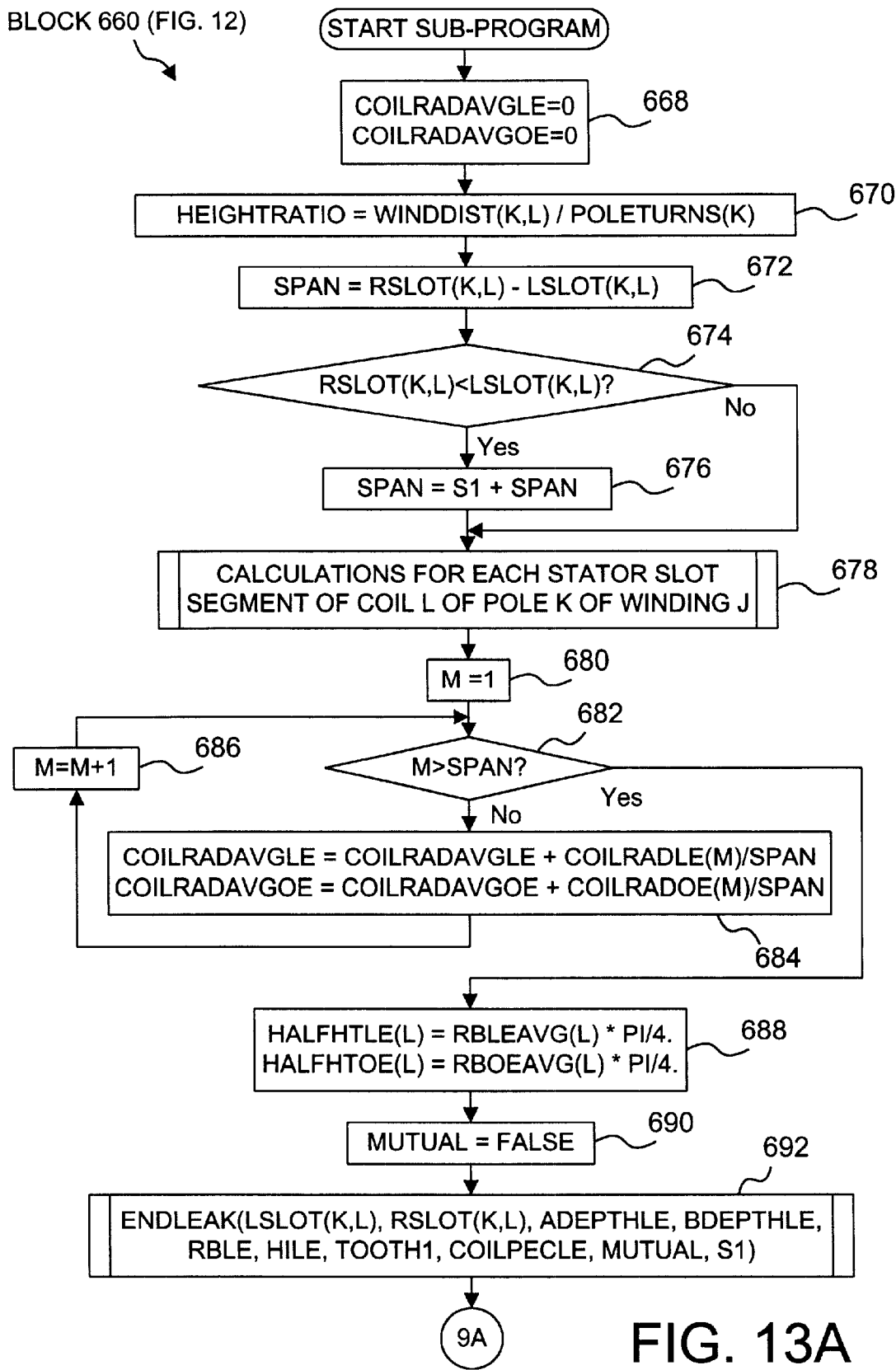
FIGS. 13A–13C, when joined along the similarly lettered lines appearing therein, are a flowchart of one implementation of the sub-program represented by block 660 of FIG. 12.
Figure 13B:
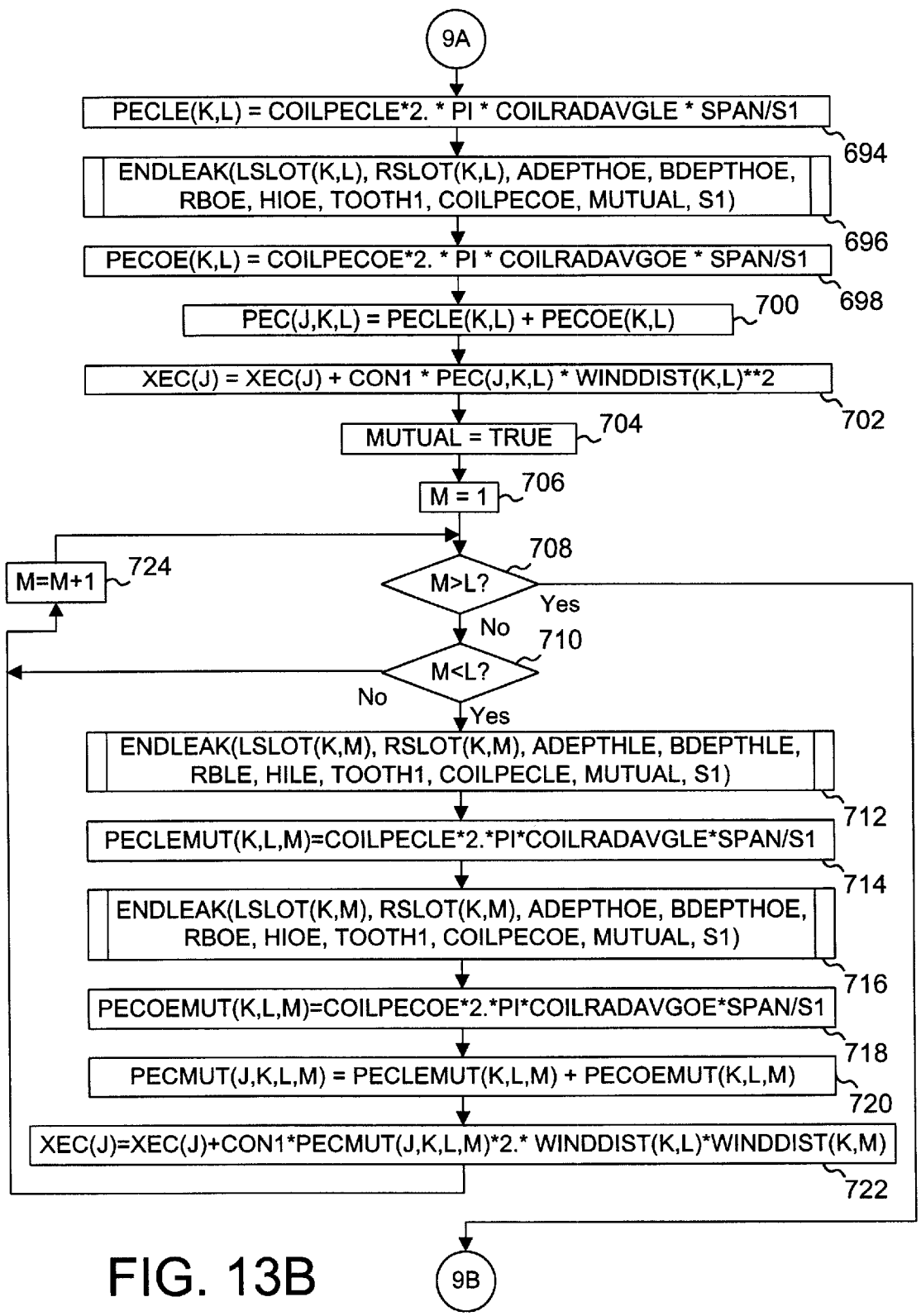

As shown in FIG. 13A, a block 668 sets the variables COILRADAVGLE and COILRADAVGOE to zero, a block 670 sets HEIGHTRATIO equal to WINDDIST(K,L) divided by POLETURNS(K), and a block 672 sets SPAN equal to RSLOT(K,L)–LSLOT(K,L). A block 674 then determines whether RSLOT(K,L) is less than LSLOT(K,L). If so, a block 676 augrnents the value of SPAN by the value of S1, and control then passes to a block 678. If the block 674 determines that RSLOT(K,L) is not less than LSLOT(K,L), then the block 676 is bypassed, and control passes directly to the block 678.

The block 678 executes a sub-program that performs calculations for each stator slot segment of coil L of pole K of winding J. This sub-program is described in detail below in connection with the flowchart of FIG. 12. Following execution of that sub-program, control returns to a block 680, which initializes a loop-counter variable M to one. A block 682 then determines whether M exceeds SPAN. If not, a block 684 augments the values of COILRADAVGLE and COILRADAVGOE by COILRADLE(M)/SPAN and COILRADOE(M)/SPAN, respectively, a block 686 increments M by one, and control returns to the block 682. When the block 682 determines that M exceeds SPAN, a block 688 sets HALFHTLE(L) equal to RBLEAVG(L)*PI/4 and sets HALFHTOE(L) equal to RBOEAVG(L)*PI/4, a block 690 sets MUTUAL equal to FALSE, and a block 692 calls a subroutine referred to as ENDLEAK, which calculates for the active coil or coil group the permeance of the leakage flux path per inch of circumference of that coil for the portion of that coil that is substantially parallel to the lamination face.

As shown in FIG. 13A, variables LSLOT(K,L), RSLOT (K,L), ADEPTHLE, BDEPTHLE, RBLE, HILE, TOOTH1, COILPECLE, MUTUAL, and S1 are specified in the call to the subroutine ENDLEAK as parameters for input and/or output. The implementation of such a subroutine is readily within the ability of those of ordinary skill in the art. However, the details of one exemplary implementation of the ENDLEAK subroutine are provided below in connection with FIGS. 15–16.

Following the ENDLEAK subroutine call of the block 692 (FIG. 13A), control returns to a block 694 (shown in FIG. 13B), which sets PECLE(K,L) equal to COILPECLE*2*PI*COILRADAVGLE*SPAN/S1. A block 696 then re-calls the subroutine ENDLEAK, this time specifying variables LSLOT(K,L), RSLOT(K,L), ADEPTHOE, BDEPTHOE, RBOE, HIOE, TOOTH1, COILPECOE, MUTUAL, and S1 as parameters. Following the ENDLEAK subroutine call of the block 696, control returns to a block 698, which sets PECOE(K,L) equal to COILPECOE*2*PI*COILRADAVGOE*SPAN/S1. A block 700 then sets PEC(J,K,L) equal to the sum of PECLE(K,L) and PECOE(K,L), a block 702 augments the value of XEC(J) by CON1*PEC(J,K,L)*WINDDIST(K,L)**2, a block 704 sets MUTUAL to TRUE, and a block 706 initializes loop-counter M to one.

A block 708 determines whether M exceeds L. If not, a block 710 determines whether M is less than L. If so, a block 712 calls the subroutine ENDLEAK with parameters LSLOT(K,M), RSLOT(K,M), ADEPTHLE, BDEPTHLE, RBLE, HILE, TOOTH1, COILPECLE, MUTUAL, and S1. A block 714 then sets PECLEMUT(K,L,M) equal to COILPECLE*2*PI*COILRADAVGLE*SPAN/S1. The subroutine ENDLEAK is then called once again by a block 716, which specifies LSLOT(K,M), RSLOT(K,M), ADEPTHLE, BDEPTHLE, RBOE, HIOE, TOOTH1, COILPECOE; MUTUAL, and S1 as parameters. A block 718 then sets PECOEMUT(K,L,M) equal to COILPECOE*2*PI*COILRADAVGOE*SPAN/S1, a block 720 sets PECMUT(J,K,L,M) equal to the sum of PECLEMUT(K,L,M) and PECOEMUT(K,L,M), and a block 722 then augments the value of XEC(J) by CON1*PECMUT(J,K,L,M)*2*WINDDIST(K,L) *WINDDIST(K,M).

Control then passes to a block 724, which increments M by one, and control then returns to the block 708. When the block 708 determines that M exceeds L, control passes to a block 726 shown in FIG. 13C. If the block 710 (FIG. 13B) determines that M is not less than L, the blocks 712–722 are bypassed, and control passes directly to the block 724.

Figure 13C:
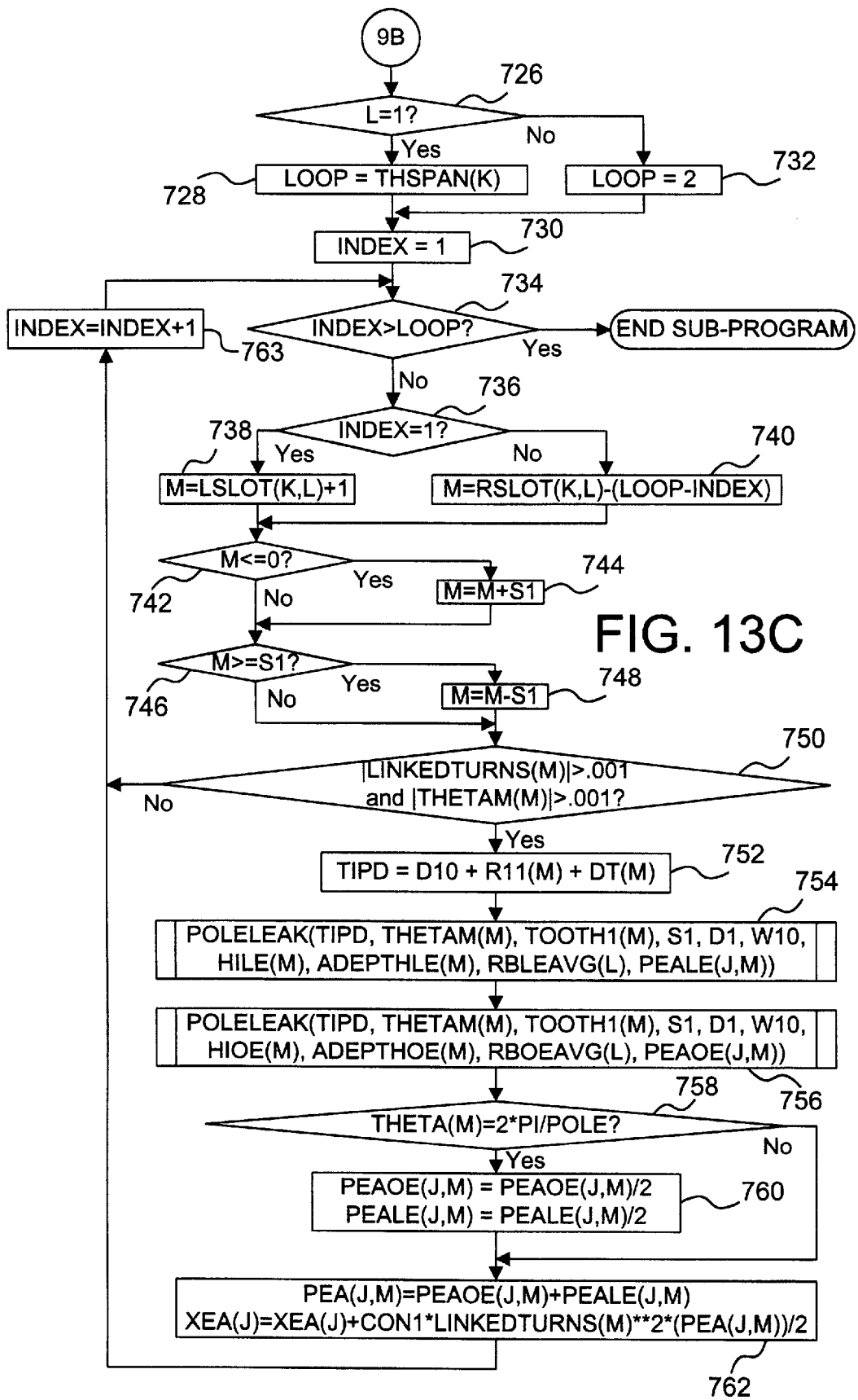

As shown in FIG. 13C, the block 726 determines whether L is equal to one. If so, a block 728 sets LOOP equal to THSPAN(K), and control passes to a block 730. If the block 726 determines that L is not equal to one, a block 732 sets LOOP equal to 2, and control then passes to the block 730.

The block 730 sets loop-counter variable INDEX to one, and a block 734 determines whether INDEX exceeds LOOP. If so, execution of the sub-program of FIGS. 13A–13C ends, and control returns to the block 662 of FIG. 12. If not, a block 736 determines whether INDEX is equal to one. If so, a block 738 sets M equal to LSLOT(K,L)+1; if not, a block 740 sets M equal to RSLOT(K,L)-(LOOP-INDEX). From either block 738 or block 740, control passes to a block 742, which determines whether M is less than or equal to zero. If so, a block 744 augments the value of M by the value of S1, and control then passes to a block 746. Otherwise, the block 744 is bypassed, and control passes to the block 746 directly.

The block 746 determines whether M is greater than or equal to S1. If so, a block 748 reduces M by S1, and control then passes to a block 750. Otherwise, the block 748 is bypassed, and control passes to the block 750 directly.

The block 750 determines whether the absolute value of LINKEDTURNS(M) exceeds 0.001 and also whether the absolute value of THETAM(M) exceeds 0.001. If both conditions are true, a block 752 sets TIPD equal to D10+ R11(M)+DT(M), a block 754 calls a subroutine referred to as POLELEAK, which calculates for the active coil or coil group the permeance of the leakage flux path per inch of circumference of that coil for the portion of that coil that is substantially perpendicular to the lamination face. As shown in FIG. 13C, variables TIPD, THETAM(M), TOOTH1(M), S1, D1, W10, HILE(M), ADEPTHLE(M), RBLEAVG(L), and PEALE(J,M) are specified in the call to the subroutine POLELEAK as parameters for input and/or output.

The implementation of such a subroutine is readily within the ability of those of ordinary skill in the art. However, the details of one exemplary implementation of the POLELEAK subroutine are provided below in connection with FIGS. 17–18.

Following the call to subroutine POLELEAK by the block 754, a block 756 (FIG. 13C) re-calls subroutine POLELEAK, specifying TIPD, THETAM(M), TOOTH1 (M), S1, D1, W10, HIOE(M), ADEPTHOE(M), RBOEAVG (L), and PEAOE(J,M).

Following the POLELEAK subroutine call of the block 756, a block 758 determines whether THETAM(M) is equal to 2*PI/POLE. If so, a block 760 sets PEAOE(J,M) equal to PEAOE(J,M)/2 and sets PEALE(J,M) equal to PEALE(J, M)/2 and control passes to a block 762. Otherwise, the block 760 is bypassed, and control passes directly to the block 762. The block 762 sets PEA(J,M) equal to the sum of PEAOE (J,M) and PEALE(J,M) and sets XEA(J) equal to the sum of XEA(J) and CON1*LINKEDTURNS(M)**2*(PEA(J,M))/ 2. Thereafter, a block 763 increments INDEX by one, and control then returns to the block 734. If either one or both of the conditions tested by the block 750 is not met, the blocks 752–762 are bypassed, and control passes directly to the block 763.

The sub-program executed by the block 678 of FIG. 13A (to perform calculations for each stator slot segment of coil L of pole K of winding J) as described above is now described in detail with reference to the flowchart of FIG. 14. The variables, arrays, and constants used by that sub-program are described in the following table.

| VARIABLE | DESCRIPTION |
|---|---|
| ADEPTHLE() | Variable which stores for each stator slot in the particular motor design the distance from the inner diameter of coil bundle to the inner diameter of the stator for that stator slot - Lead End |
| ADEPTHOE() | Variable which stores for each stator slot in the particular motor design the distance from the inner diameter of coil bundle to the inner diameter of the stator for that stator slot - Opposite End |
| BDEPTHLE() | Variable which stores for each stator slot in the particular motor design the distance from the outer diameter of the coil bundle to the outer diameter of the stator for that stator slot - Lead End |
| BDEPTHOE() | Variable which stores for each stator slot in the particular motor design the distance from |

-continued

| VARIABLE | DESCRIPTION |
|---|---|
| | the outer diameter of the coil bundle to the outer diameter of the stator for that stator slot - Opposite End |
| COILAREALE | Variable which stores the assumed cross-sectional area of the active coil bundle above the active stator tooth - Lead End |
| COILAREAOE | Variable which stores the assumed cross-sectional area of the active coil bundle above the active stator tooth - Opposite End |
| COILRADLE() | Array which stores for each stator slot in the particular motor design the distance from the axial center of the stator bore to the middle of the coil bundle occupying the stator slot - Lead End |
| COILRADOE() | Array which stores for each stator slot in the particular motor design the distance from the axial center of the stator bore to the middle of the coil bundle occupying the stator slot - Opposite End |
| D1 | Motor-specific constant which stores the inner diameter of the stator in the particular motor design (i.e., the stator bore diameter bordering the motor air gap) |
| DEPTHRATIO | Variable which stores the assumed depth of the end-turn bundle for the active winding in the particular motor design |
| ENDAREALE() | Array which stores for each stator slot in the particular motor design the available area in the end-turn region above the stator teeth at that stator slot - Lead End |
| ENDAREAOE() | Array which stores for each stator slot in the particular motor design the available area in the end-turn region above the stator teeth at that stator slot - Opposite End |
| ENDD1LE() | Array which stores for each stator slot in the particular motor design the equivalent inner diameter of the coil bundle occupying that stator slot - Lead End |
| ENDD1OE() | Array which stores for each stator slot in the particular motor design the equivalent inner diameter of the coil bundle occupying that stator slot - Opposite End |
| ENDD2LE() | Array which stores for each stator slot in the particular motor design the equivalent outer diameter of the coil bundle occupying that stator slot - Lead End |
| ENDD2OE() | Array which stores for each stator slot in the particular motor design the equivalent outer diameter of the coil bundle occupying that stator slot - Opposite End |
| ENDH1LE() | Array which stores for each stator slot in the particular motor design the equivalent height above the core (i.e., the top of the coil bundle) at that stator slot - Lead End |
| ENDH1OE() | Array which stores for each stator slot in the particular motor design the equivalent height above the core (i.e., the top of the coil bundle) at that stator slot - Opposite End |
| HEIGHTRATIO | Variable which stores for a particular coil under consideration the assumed height of the endturn bundle for that coil |
| HILE() | Motor-specific array which stores for each stator slot of the particular motor design the distance between the radially innermost end of the coil bundle and the stator for that stator slot - Lead End |
| HIOE() | Motor-specific array which stores for each stator slot of the particular motor design the distance between the radially innermost end of the coil bundle and the stator for that stator slot - Opposite End |
| INDEX | Loop counter and/or array-index variable |
| KCMIL2SQIN | Conversion factor to convert from 1000 circular mils to square inches |
| LSLOT(K,L) | Array which stores for each coil L of each pole K of the particular motor design the slot number containing the left-hand coil side of that coil |
| M | Loop counter and/or array-index variable |
| PI | The irrational constant π equal to approximately 3.14159265358979323842643 |
| RBLE() | Array which stores for each stator tooth of the particular motor design the equivalent radius of the coil bundle over that stator tooth - Lead End |
| RBLEAVG() | Array which stores for each coil bundle of the active pole of the active winding in the particular motor design, the average of the equivalent radii (across the slots spanned by that coil bundle) of that coil bundle - Lead End |
| RBOE() | Array which stores for each stator tooth of the particular motor design the equivalent radius of the coil bundle over that stator tooth - Opposite End |
| RBOEAVG() | Array which stores for each coil bundle of the active pole of the active winding in the particular motor design, the average of the equivalent radii (across the slots spanned by that coil bundle) of that coil bundle - Opposite End |
| S1 | Variable which stores the number of stator slots in the particular motor design |
| SPAN | Variable which stores the number of stator teeth or stator slots spanned by a particular coil under consideration |
| TROUT() | Array which stores for each stator tooth of the particular motor design the radius to the radially outermost dimension of the stator at (behind) that tooth |
| USEDDEPTHLE() | Array which stores for each stator slot in the particular motor design the depth of available coil bundle area in that slot occupied by windings inserted prior to the "active" winding (i.e., the winding being considered at any given point during execution of the program) - Lead End |
| USEDDEPTHOE() | Array which stores for each stator slot in the particular motor design the depth of available coil bundle area in that slot occupied by windings inserted prior to the "active" winding (i.e., the winding being considered at any given point during execution of the program) - Opposite End |
| USEDHEIGHTLE | Variable which stores the height of available bundle area occupied by coils below the coil under consideration - Lead End |
| USEDHEIGHTOE | Variable which stores the height of available bundle area occupied by coils below the coil under consideration - Opposite End |

Figure 14:
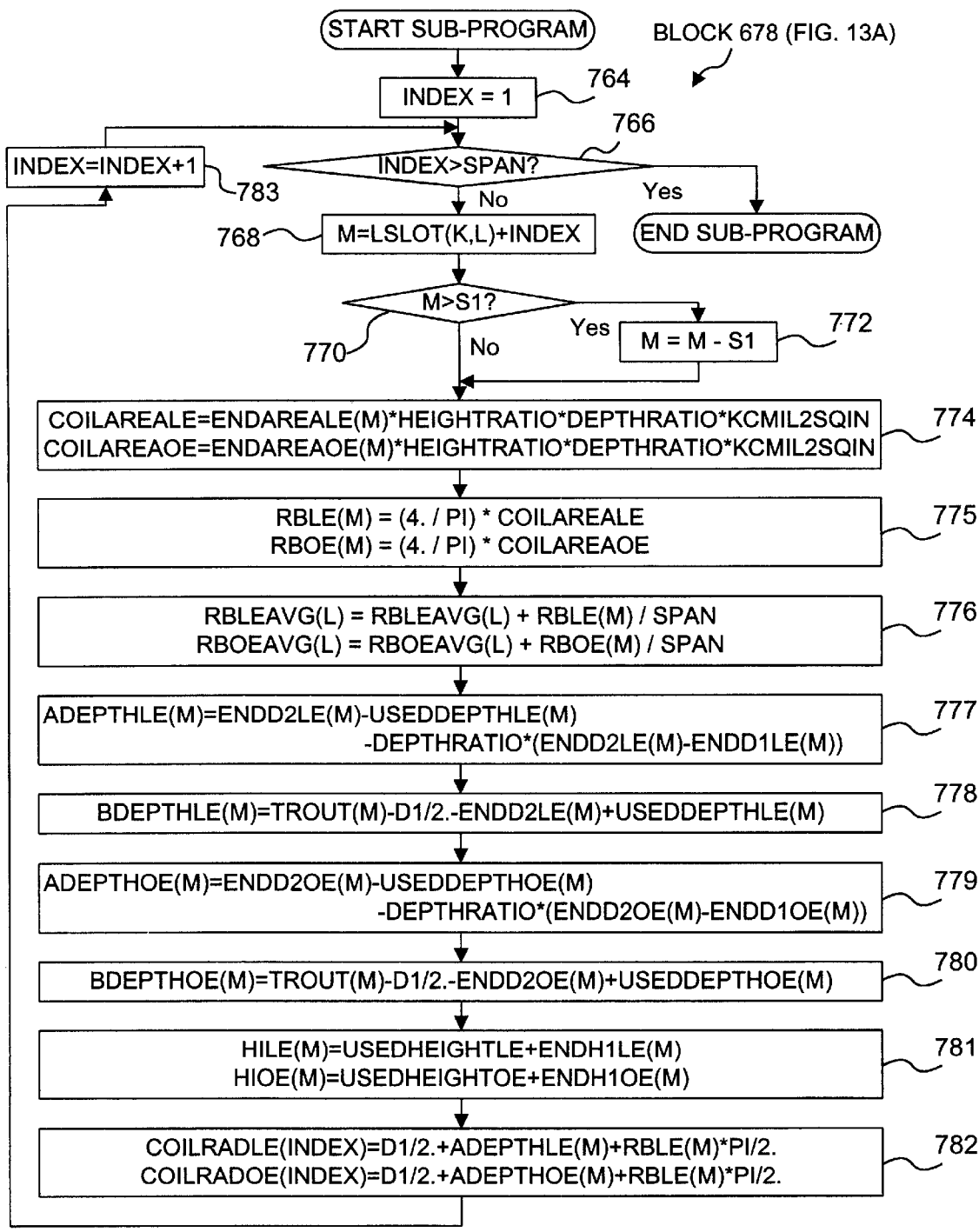
FIG. 14 is a flowchart of one implementation of the sub-program represented by block 678 of FIG. 13A.

As shown in FIG. 14, a block 764 initializes loop-counter variable INDEX to one, and a block 766 determines whether INDEX exceeds SPAN. If not, a block 768 sets M equal to the sum of LSLOT(K,L) and INDEX, and a block 770 determines whether M exceeds S1. If so, a block 772 reduces M by the value of S1, and control passes to a block 774. If the block 770 determines that M does not exceed S1, the block 772 is bypassed, and control passes to the block 774 directly.

The block 774 sets COILAREALE equal to ENDAREALE(M)*HEIGHRATIO*DEPTHRATIO*KCMIL2SQIN and sets COILAREAOE equal to ENDAREAOE(M)*HEIGHTRATIO*DEPTHRATIO*KCMIL2SQIN. A block 775 then sets RBLE(M) and RBOE(M) equal to (4/PI)*COILAREALE and (4/PI)*COILAREAOE, respectively. A block 776 then augments RBLEAVG(L) by RBLE(M)/SPAN and augments RBOEAVG(L) by RBOE(M)/SPAN.

A block 777 sets ADEPTHLE(M) equal to ENDD2LE(M)−USEDDEPTHLE(M)−DEPTHRATIO*(ENDD2LE (M)–ENDD1LE(M)), and a block 778 sets BDEPTHLE(M) equal to TROUT(M)–D1/2–ENDD2LE(M)+ USEDDEPTHLE(M). Correspondingly, a block 779 sets ADEPTHOE(M) equal to ENDD2OE(M)– USEDDEPTHOE(M)–DEPTHRATIO*(ENDD2OE(M)– ENDD1OE(M)), and a block 780 sets BDEPTHOE(M) equal to TROUT(M)–D1/2–ENDD2OE(M)+ USEDDEPTHOE(M).

A block 781 then sets HILE(M) equal to the sum of USEDHEIGHTLE and ENDH1LE(M) and sets HIOE(M) equal to the sum of USEDHEIGHTOE and ENDH1OE(M), and a block 782 sets COILRADLE(INDEX) equal to ½*D1+ADEPTHLE(M)+RBLE(M)*PI/2 and sets COILRADOE(INDEX) equal to ½*D1+ADEPTHOE(M)+ RBLE(M)*PI/2. A block 783 then increments INDEX by one, and control returns to the block 766. When the block 766 determines that INDEX exceeds SPAN, execution of the sub-program represented by the flowchart of FIG. 14 ends, and control returns to the block 680 of FIG. 13A.

The ENDLEAK subroutine called by the block 692 of FIG. 13A and by the blocks 696, 712, and 716 of FIG. 13B as described above is now described in detail with reference to the flowchart of FIG. 15. The variables, arrays, and constants used by the ENDLEAK subroutine are described in the following table.

| VARIABLE | DESCRIPTION |
| --- | --- |
| COILPEC | Variable which stores the individual pole permeance for the particular coil under consideration |
| COILSTART | Variable which stores the stator slot number of the left-hand side of a particular coil under consideration |
| COILSTOP | Variable which stores the stator slot number of the right-hand side of a particular coil under consideration |
| II | Loop counter and/or array-index variable |
| INDEX | Loop counter and/or array-index variable |
| S1 | Variable which stores the number of stator slots in the particular motor design |
| SPAN | Variable which stores the number of stator teeth or stator slots spanned by a particular coil under consideration |

Figure 15:
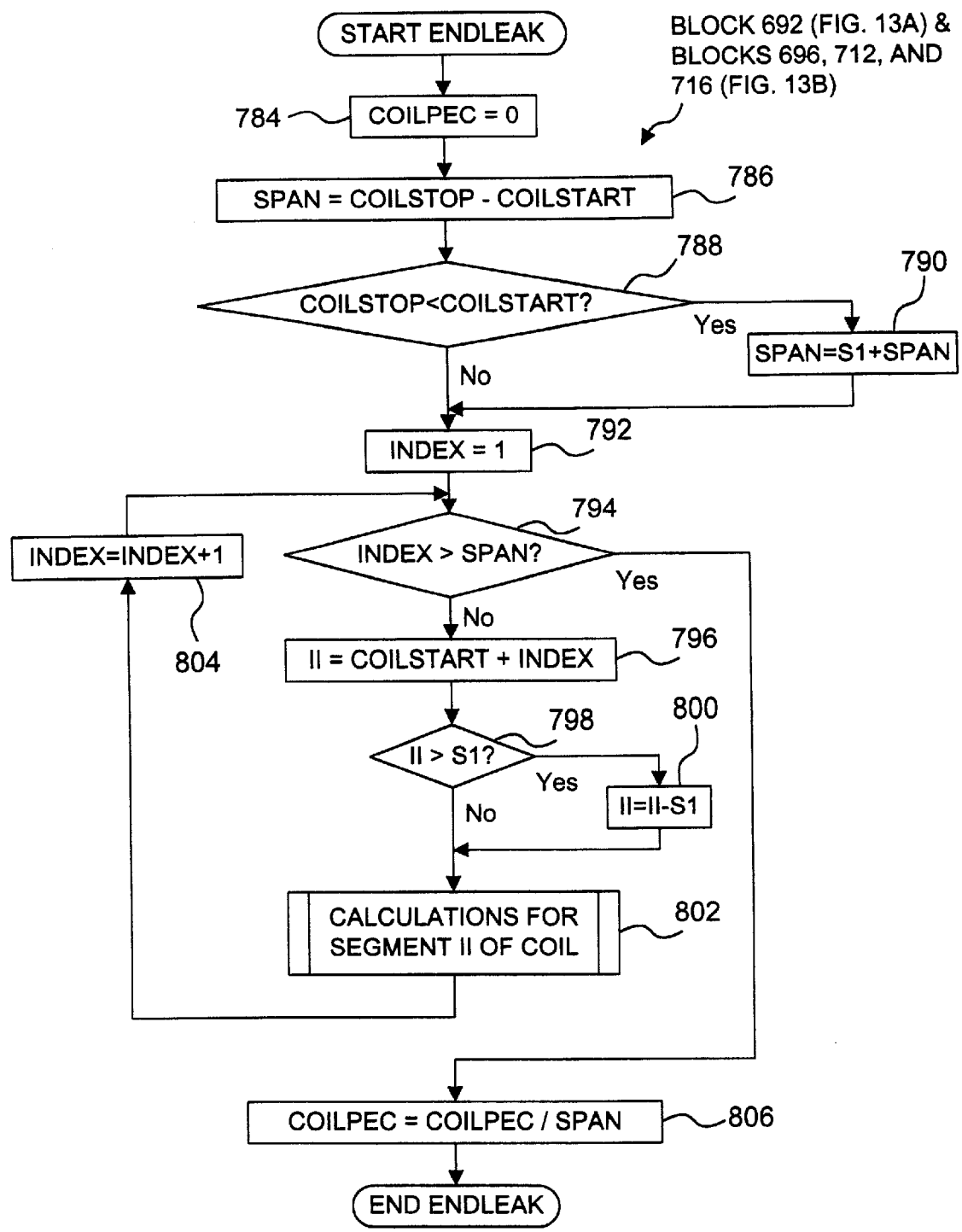
FIG. 15 is a flowchart of one implementation of the subroutine represented by block 692 of FIGS. 13A and by any of blocks 696, 712, and 716 of FIG. 13B.

As shown in FIG. 15, a block 784 sets COILPEC equal to zero, and a block 786 sets SPAN equal to COILSTOP– COILSTART. A block 788 then determines whether COIL-STOP is less than COILSTART. If so, a block 790 augments the value of SPAN by the value of S1, and control passes to a block 792. Otherwise, the block 790 is bypassed, and control passes directly to the block 792. The block 792 sets INDEX equal to one, and a block 794 determines whether INDEX exceeds SPAN. If not, a block 796 sets II equal to the sum of COILSTART and INDEX. A block 798 then determines whether II exceeds S1. If so, a block 800 reduces the value of II by S1, and control passes to a block 802. If the block 798 determines that II does not exceed S1, the block 800 is bypassed, and control passes to the block 802 directly.

The block 802 executes a sub-program which performs calculations for coil segment II as described in detail below in connection with the flowchart of FIG. 16. Following execution of that sub-program, a block 804 increments INDEX by one and control returns to the block 794. When the block 794 determines that INDEX exceeds SPAN, a block 806 sets COILPEC equal to COILPEC/SPAN, and execution of the ENDLEAK subroutine represented by the flowchart of FIG. 15 ends, with control returning the block following the block (of FIGS. 13A or 13B) which called the ENDLEAK subroutine in any given instance.

The sub-program executed by the block 802 of FIG. 15 as described above is now described in detail with reference to the flowchart of FIG. 16. The variables, arrays, and constants used by this sub-program are described in the following table.

| VARIABLE | DESCRIPTION |
| --- | --- |
| A | Variable which stores for a particular coil under consideration the distance from the center of that coil bundle to the inner diameter corner of the stator |
| ADEPTH() | Array which stores for each stator slot of the particular motor design the distance from the inner diameter of the coil bundle occupying that stator slot to the inner diameter of the stator at that stator slot |
| B | Variable which stores for a particular coil under consideration the distance from the center of that coil bundle to the outer diameter corner of the stator |
| BDEPTH() | Array which stores for each stator slot of the particular motor design the distance from the outer diameter of the coil bundle occupying that stator slot to the outer diameter of the stator at that stator slot |
| C | Variable which stores for a particular bundle a concave portion of the leakage path generally located opposite the stator iron from that bundle |
| COILPEC | Variable which stores the individual pole permeance for the particular coil under consideration |
| EMP | Variable used to simplify KEC expression |
| F | Variable used to simplify expressions |
| G | Variable used to simplify expressions |
| HI() | Array which stores for each stator slot of the particular motor design the height of the coil bundle above that slot |
| IN2CM | Conversion factor to convert from inches to centimeters |
| INR | Variable which stores the calculated value of an integral from zero to the radius of a particular coil bundle |
| KEC | Variable which stores an empirical correction factor |
| MUTUAL | Boolean flag variable used internally within program to select individual-pole (self-reactance) or pole-to-pole (mutual reactance) calculations |
| PEC() | Array which stores for each stator slot of the particular motor design the individual pole leakage permeance at that stator slot |
| PI | The irrational constant π equal to approximately 3.14159265358979323842643 |
| Q | Variable used to simplify expressions |
| Q2PI | Variable used to simplify expressions |
| RB() | Array which stores for each stator slot of the particular motor design the effective radius of the coil bundle occupying that stator slot |
| RTOX | Variable which stores the calculated value of an integral from R to X |
| THETAA | Variable which stores the angle between the segment defining A and the face of the stator in the same radial plane as that segment |
| THETAB | Variable which stores the angle between the segment defining B and the face of the stator in the same radial plane as that segment |
| TOOTH | Variable which stores the effective width of a stator tooth |
| TOOTH1() | Array which stores for each stator tooth (i.e., one for each stator slot) the width of that stator tooth |
| X | Variable which stores an upper limit for |

-continued

| VARIABLE | DESCRIPTION |
| --- | --- |
| | integration of flux linking an end-turn bundle (e.g., the distance from center of the end-turn bundle to the face of the stator core) |
| XTOA | Variable which stores the value of an integral from X to A to the outer corner of the stator core |
| YA | Variable which stores for a particular cross-section of the end-turn bundle the radial distance from the center of a coil bundle to the inner diameter of the stator parallel to the stator core face |
| YB | Variable which stores for a particular cross-section of the end-turn bundle the radial distance from the center of a coil bundle to the outer diameter of the stator parallel to the stator core face |

Figure 16:
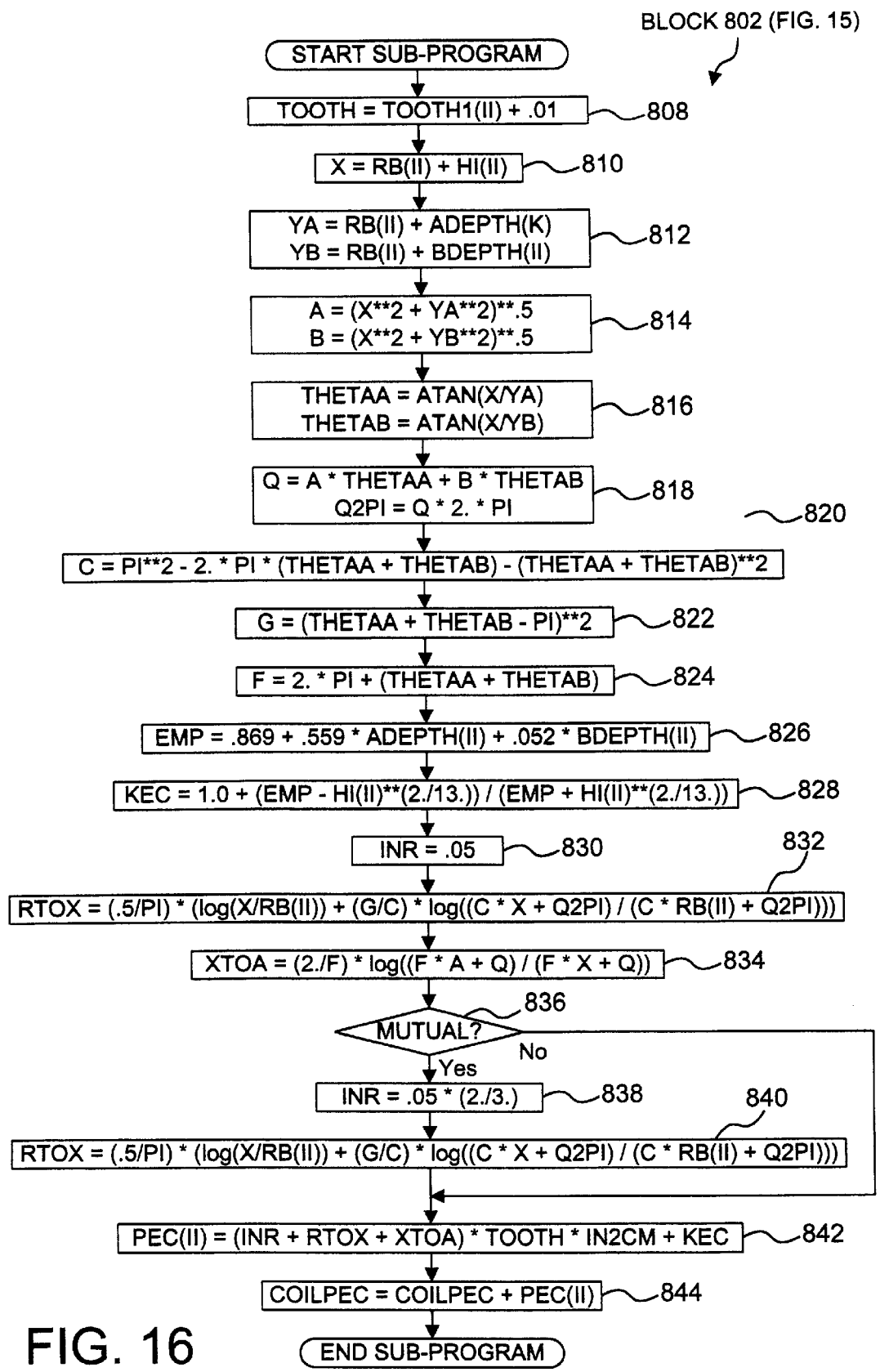
FIG. 16 is a flowchart of one implementation of the sub-program represented by block 802 of FIG. 15.

As shown in FIG. 16, a block 808 sets TOOTH equal to TOOTH1(II)+0.01, and a block 810 sets X equal to the sum of RB(II) and HI(II). A block 812 then sets YA equal to RB(II)+ADEPTH(K) and sets YB equal to RB(II)+BDEPTH(II). A block 814 sets A equal to (X2+YA2)0.5 and sets B equal to (X2+YB2)0.5, and a block 816 sets THETAA and THETAB equal to atan(X/YA) and atan(X/YB), respectively. A block 818 then sets Q equal to A*THETAA+B*THETAB and sets Q2PI equal to Q*2*PI. A block 820 then sets C equal to PI**2−2*PI*(THETAA+THETAB)−(THETAA+THETAB)2. A block 822 then sets G equal to (THETAA+THETAB−PI)2, and a block 824 sets F equal to 2*PI+(THETAA+THETAB). A block 826 sets EMP equal to 0.869+0.559*ADEPTH(II)+0.052*BDEPTH(II), and a block 828 sets KEC equal to 1.0+(EMP−HI(II)(2/13))/(EMP+HI(II)(2/13)).

A block 830 then sets INR equal to 0.05. A block 832 then sets RTOX equal to (0.5/PI)*(log(X/RB(II))+(G/C)*log((C*X+Q2PI)/(C*RB(II)+Q2PI))), and a block 834 sets XTOA equal to (2/F)*log((F*A+Q)/(F*X+Q)). A block 836 then determines whether MUTUAL is true. If so, a block 838 sets INR equal to 0.05+(p2/3), a block 840 sets RTOX equal to (0.5/PI)*(log(X/RB(II))+(G/C)*log((C*X+Q2PI)/(C*RB(II)+Q2PI))), and control then passes to a block 842. If the block 836 determines that MUTUAL is FALSE, the blocks 838 and 840 are bypassed, and control passes to the block 842 directly. The block 842 sets PEC(II) equal to (INR+RTOX+XTOA)*TOOTH*IN2CM+KEC, a block 844 augments the value of COILPEC by PEC(II), and execution of the sub-program represented by the flowchart of FIG. 16 thereafter ends, and control returns to the block 804 of FIG. 15.

The POLELEAK subroutine called by each of the blocks 754 and 756 of FIG. 13C as described above is now described in detail with reference to the flowchart of FIG. 17. The variables, arrays, and constants used by the POLELEAK subroutine are described in the following table.

| VARIABLE | DESCRIPTION |
| --- | --- |
| A | Variable which stores the distance from the inner diameter of a coil bundle to the inner diameter of the stator |
| BOREREGION | Variable used to simplify PEA expression |
| D1 | Variable which stores the diameter of the stator bore of the particular motor design |
| H | Variable which stores a height adjustment for a flux path (an empirical function of the axial separation of the coil bundle from stator core iron) |
| HI | Variable which stores the distance between the bottom of a coil bundle and the stator |
| IN2CM | Conversion factor to convert from inches to centimeters |
| PEA | Variable which stores the pole-to-pole permeance for a particular flux tube under consideration from the tooth face to the centerline between the centers of two adjacent poles |
| PI | The irrational constant π equal to approximately 3.1415926535897932384264 |
| RB | Variable which stores the equivalent radius of a coil bundle |
| S | Variable which stores the angular span of the tooth of a particular tooth region |
| S1 | Variable which stores the number of stator slots in the particular motor design |
| SA | Variable which stores the angular span of the tooth tip of a particular tooth region |
| THETAM | Variable which stores the angle in mechanical radians spanned by a flux tube |
| TIP | Variable which stores the effective width of the tip of a stator tooth |
| TIPREGION | Variable used to simplify PEA expression |
| TOOTH1 | Variable which stores the width of a stator tooth |
| TOOTHREGION | Variable used to simplify PEA expression |
| TTH | Variable which stores the effective width of a stator tooth |
| UA | Variable which stores the mean radius for an assumed flux tube joining the stator tooth tip of a pole to a centerline between that pole and an adjacent pole |
| UB | Variable which stores the mean radius for an assumed flux tube joining the stator tooth of a pole to a centerline between that pole and an adjacent pole |
| UC | Variable which stores the mean radius for an assumed flux tube joining the bore face of the stator tooth tip of a pole to a centerline between that pole and an adjacent pole |
| VA | Variable used to simplify expression |
| VB | Variable used to simplify expression |
| VC | Variable used to simplify expression |
| W10 | Variable which stores the width of a particular stator slot opening |
| ZA | Variable which stores the length of a stator tooth tin |
| ZB | Variable which stores the radial distance along the face of a stator tooth from a radially outermost edge of the tip of that stator tooth to a point underlying the center of the coil bundle encircling that stator tooth |
| ZC | Variable which stores the hypotenuse of a right triangle having as a first side the segment including ZA and ZB and having as a second side the perpendicular distance from the face of a particular stator tooth to the center of the coil bundle encircling that stator tooth |

Figure 17:
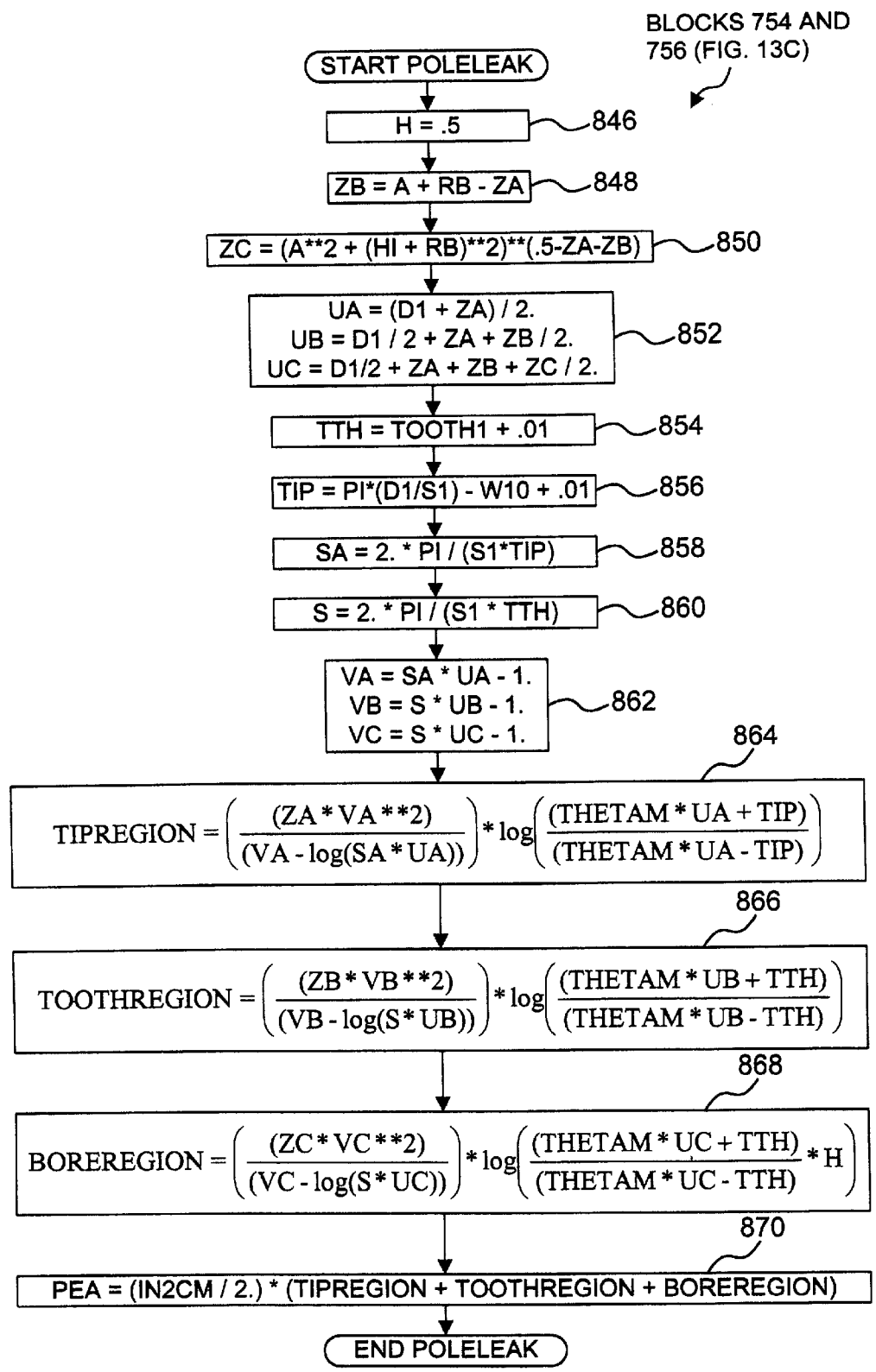
FIG. 17 is a flowchart of one implementation of the subroutine represented by either of blocks 754 and 756 of FIG. 13C.

As shown in FIG. 17, a block 846 sets H equal to 0.5, a block 848 sets ZB equal to A+RB−ZA, and a block 850 sets ZC equal to (A2+(HI+RB)2)**(0.5−ZA−ZB). A block 852 then sets UA equal to (D1+ZA)/2, UB equal to D1/2+ZA+ZB/2, and UC equal to D1/2+ZA+ZB+ZC/2. A block 854 then sets TTH equal to TOOTH1+0.01, a block 856 sets TIP equal to PI*(D1/S1)−W10+0.01, a block 858 sets SA equal to 2*PI/(S1*TIP), and a block 860 sets S equal to 2*PI/(S1*TTH). A block 862 then sets VA equal to SA*UA−1, VB equal to S*UB−1, and VC equal to S*UC−1.

Thereafter, a block 864 sets TIPREGION equal to (ZA*VA**2)/(VA−log(SA*UA))*log((THETAM*UA+TIP)/(THETAM*UA−TIP). A block 866 sets TOOTHREGION equal to (ZB*VB**2)/(VB−log(S*UB))*log((THETAM*UB+TTH)/(THETAM*UB−TTH)). A block 868 sets BOREREGION equal to (ZC*VC**2)/(VC−log(S*UC))*log((THETAM*UC+TTH)/(THETAM*UC−TTH))*H). Finally, a block 870 sets PEA equal to (IN2CM/2) times the sum of TIPREGION, TOOTHREGION, and BOREREGION, and execution of the POLELEAK subroutine represented by the flowchart of FIG. 17 then ends, with control returning the block following whichever of blocks 754 or 756 (of FIGS. 13C) called the POLELEAK subroutine.

The sub-program executed by the block 172 of FIG. 5 as described above is now described in detail with reference to the flowchart of FIG. 18. The variables, arrays, and constants used by this sub-program are described in the following table.

| VARIABLE | DESCRIPTION |
| --- | --- |
| DEPTHRATIO | Variable which stores the assumed depth of the end-turn bundle for the active winding in the particular motor design |
| ENDD1LE( ) | Array which stores for each stator slot in the particular motor design the equivalent inner diameter of the coil bundle occupying that stator slot - Lead End |
| ENDD1OE( ) | Array which stores for each stator slot in the particular motor design the equivalent inner diameter of the coil bundle occupying that stator slot - Opposite End |
| ENDD2LE( ) | Array which stores for each stator slot in the particular motor design the equivalent outer diameter of the coil bundle occupying that stator slot - Lead End |
| ENDD2OE( ) | Array which stores for each stator slot in the particular motor design the equivalent outer diameter of the coil bundle occupying that stator slot - Opposite End |
| K | Loop counter and/or array-index variable |
| S1 | Variable which stores the number of stator slots in the particular motor design |
| USEDDEPTHLE( ) | Array which stores for each stator slot in the particular motor design the depth of available coil bundle area in that slot occupied by windings inserted prior to the "active" winding (i.e., the winding being considered at any given point during execution of the program) - Lead End |
| USEDDEPTHOE( ) | Array which stores for each stator slot in the particular motor design the depth of available coil bundle area in that slot occupied by windings inserted prior to the "active" winding (i.e., the winding being considered at any given point during execution of the program) - Opposite End |

Figure 18:
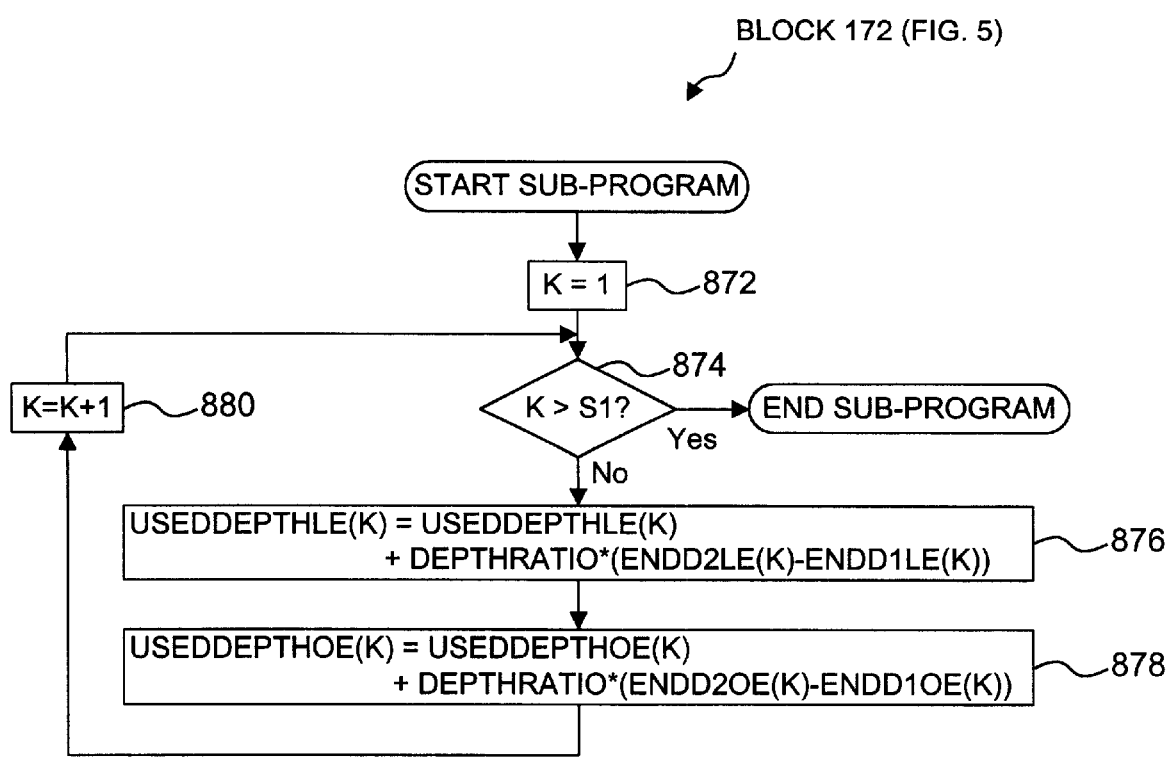
FIG. 18 is a flowchart of one implementation of the sub-program represented by block 172 of FIG. 5.

As shown in FIG. 18, a block 872 initializes a loop-counter variable K to one, and a block 874 determines whether K exceeds S1. If not, a block 876 augments the value of USEDDEPTHLE(K) by DEPTHRATIO*(ENDD2LE(K)−ENDD1LE(K)), a block 878 augments the value of USEDDEPTHOE(K) by DEPTHRATIO*(ENDD2OE(K)−ENDD1OE(K)), a block 880 increments K by one, and control returns to the block 874. When the block 874 determines that K exceeds S1, execution of the sub-program represented by the flowchart of FIG. 18 ends, and control returns to the block 174 of FIG. 5.

The foregoing description is for the purpose of teaching those skilled in the art the best mode of carrying out the invention and is to be construed as illustrative only. Numerous modifications and alternative embodiments of the invention will be apparent to those skilled in the art in view of this description, and the details of the disclosed structure may be varied substantially without departing from the spirit of the invention. Accordingly, the exclusive use of all modifications within the scope of the appended claims is reserved.

What is claimed is:

1. A method of developing an end-turn leakage reactance approximation for turns of coils of a stator winding of an electric motor having a stator with a predetermined number of stator slots within which the turns of the coils of the stator winding are distributed according to a predetermined distribution, said stator winding including at least two stator poles, the method comprising the steps of:

developing a first indication representing a pole-to-pole permeance based on an approximated leakage flux path linking coils of two poles;

developing a second indication representing an individual pole permeance for an approximated leakage flux path linking coils of an individual pole; and combining the first and second indications to produce an end-turn leakage reactance approximation;

wherein at least one of the first and second indications is developed in accordance with a discrete representation of the predetermined distribution of the turns of the stator winding.

2. The method of claim 1, wherein the stator winding turns occupy predetermined radial positions in respective stator winding slots, and wherein at least one of the first and second indications is based on at least one of the predetermined radial positions.

3. The method of claim 1, wherein the predetermined distribution is distorted from sinusoidal to a predetermined extent, and wherein at least one of the first and second indications is based on the extent of distortion of the predetermined distribution from sinusoidal.

4. The method of claim 1, wherein the electric motor includes a plurality of stator windings and wherein the first and second indications represent respective permeance totals for all of the stator windings.

5. The method of claim 1, wherein the electric motor includes a plurality of stator windings wound in a predetermined winding order, and wherein at least one of the first and second indications is based on the predetermined winding order.

6. The method of claim 1, wherein at least one of the first and second indications is based on the predetermined number of stator slots.

7. The method of claim 1, wherein at least one of the first and second indications is developed by combining permeance contributions of a plurality of portions of the stator winding.

8. The method of claim 7, wherein the plurality of portions of the stator winding comprise circumferential segments of the stator winding, and wherein at least one of the first and second indications is developed by combining permeance contributions of each of the circumferential segments.

9. The method of claim 1, wherein the end-turn leakage flux approximation produced by the combining step comprises a parameter of a circuit model of the electric motor.

10. A method of developing an end-turn leakage flux approximation for turns of coils of a stator winding of an electric motor having a stator with a predetermined number of stator slots within which the turns of the stator winding are distributed according to a predetermined distribution, said stator winding including at least two stator poles, the method comprising:
- a step for developing a first indication representing a pole-to-pole permeance;
- a step for developing a second indication representing an individual pole permeance; and
- a step for combining the first and second indications to produce an end-turn leakage flux approximation;
- wherein at least one of the first and second indications is developed in accordance with a discrete representation of the predetermined distribution of the turns of the stator winding.

11. A computer-based system for developing an end-turn leakage flux approximation for turns of a stator winding of an electric motor having a stator with a predetermined number of stator slots within which the turns of the stator winding are distributed according to a predetermined distribution, said stator winding including at least two stator poles, the system comprising:
- a processing unit coupled with a storage;
- a first set of instructions storable in the storage and executable by the processing unit for developing a first indication representing a pole-to-pole permeance based on an approximated leakage flux path linking two poles;
- a second set of instructions storable in the storage and executable by the processing unit for developing a second indication representing an individual pole permeance based on an approximated leakage flux path linking an individual pole; and
- a third set of instructions storable in the storage and executable by the processing unit for combining the first and second indications to produce an end-turn leakage flux approximation;
- wherein at least one of the first and second indications is developed in accordance with a discrete representation of the predetermined distribution of the turns of the stator winding.

12. The system of claim 11, wherein the stator winding turns occupy predetermined radial positions in respective stator winding slots, and wherein at least one of the first and second sets of computer-executable program code employs at least one of the predetermined radial positions.

13. The system of claim 11, wherein the predetermined distribution is distorted from sinusoidal to a predetermined extent, and wherein at least one of the first and second sets of computer-executable program code employs the extent of distortion of the predetermined distribution from sinusoidal.

14. The system of claim 11, wherein the electric motor includes a plurality of stator windings and wherein the first and second indications represent respective permeance totals for all of the stator windings.

15. The system of claim 11, wherein the electric motor includes a plurality of stator windings wound in a predetermined winding order, and wherein at least one of the first and second indications is based on the predetermined winding order.

16. The system of claim 11, wherein at least one of the first and second sets of computer-executable program code employs the predetermined number of stator slots.

17. The system of claim 11, wherein at least one of the first and second indications is developed by combining permeance contributions of a plurality of portions of the stator winding.

18. The system of claim 17, wherein the portions of the stator winding comprise circumferential segments of the stator winding, and wherein at least one of the first and second sets of computer-executable program code combines permeance contributions of each of the circumferential segments.

19. The system of claim 11, wherein the end-turn leakage flux approximation produced by the third set of computer-executable program code comprises a parameter of a circuit model of the electric motor.

20. A computer program stored in a storage for causing a computer to develop an end-turn leakage flux approximation for turns of coils of a stator winding of an electric motor having a stator with a predetermined number of stator slots within which the turns of the stator winding are distributed according to a predetermined distribution, said stator winding including at least two stator poles, the computer program comprising a storage having encoded therein:
- a first set of computer-executable program code to cause the computer to develop a first indication representing a pole-to-pole permeance based on an approximated leakage flux path linking two poles;
- a second set of computer-executable program code to cause the computer to develop a second indication representing an individual pole permeance based on an approximated leakage flux path linking an individual pole; and
- a third set of computer-executable program code to cause the computer to combine the first and second indications to produce an end-turn leakage flux approximation;
- wherein at least one of the first and second indications is developed in accordance with a discrete representation of the predetermined distribution of the turns of the stator winding.

21. The computer program of claim 20, wherein the stator winding turns occupy predetermined radial positions in respective stator winding slots, and wherein at least one of the first and second sets of instructions employs at least one of the predetermined radial positions.

22. The computer program of claim 20, wherein the predetermined distribution is distorted from sinusoidal to a predetermined extent, and wherein at least one of the first and second sets of instructions employs the extent of distortion of the predetermined distribution from sinusoidal.

23. The computer program of claim 20, wherein the electric motor includes a plurality of stator windings and wherein the first and second indications represent respective permeance totals for all of the stator windings.

24. The computer program of claim 20, wherein the electric motor includes a plurality of stator windings wound in a predetermined winding order, and wherein at least one of the first and second indications is based on the predetermined winding order.

25. The computer program of claim 20, wherein at least one of the first and second sets of instructions employs the predetermined number of stator slots.

26. The computer program of claim 20, wherein at least one of the first and second indications is developed by combining permeance contributions of a plurality of portions of the stator winding.

27. The computer program of claim 26, wherein the portions of the stator winding comprise circumferential segments of the stator winding, and wherein at least one of the first and second sets of instructions combines permeance contributions of each of the circumferential segments.

28. The computer program of claim 20, wherein the end-turn leakage flux approximation produced by the third set of instructions comprises a parameter of a circuit model of the electric motor.

29. A computer-based system for developing an end-turn leakage flux approximation for turns of coils of a stator winding of an electric motor having a stator with a predetermined number of stator slots within which the turns of the stator winding are distributed according to a predetermined distribution, said stator winding including at least two stator poles, the system comprising:

a processing unit coupled with a storage containing a first set of instructions executable by the processing unit for developing a first indication representing a pole-to-pole permeance based on an approximated leakage flux path linking two poles, a second set of instructions executable by the processing unit for developing a second indication representing an individual pole permeance based on an approximated leakage flux path linking one pole, and a third set of instructions executable by the processing unit for combining the first and second indications to produce an end-turn leakage flux approximation;

wherein at least one of the first and second indications is developed in accordance with a discrete representation of the predetermined distribution of the turns of the stator winding.

30. A storage containing software for developing an end-turn leakage flux approximation for turns of coils of a stator winding of an electric motor having a stator with a predetermined number of stator slots within which the turns of the stator winding are distributed according to a predetermined distribution, said stator winding including at least two stator poles, the storage comprising:

means for developing a first indication representing a pole-to-pole permeance based on an approximated leakage flux path linking two poles;

means for developing a second indication representing an individual pole permeance based on an approximated leakage flux path linking one pole; and means for combining the first and second indications to produce an endturn leakage flux approximation;

wherein at least one of the first and second indications is developed in accordance with a discrete representation of the predetermined distribution of the turns of the stator winding.

* * * * *